US012384028B2

(12) United States Patent
Ishikawa et al.

(10) Patent No.: US 12,384,028 B2
(45) Date of Patent: Aug. 12, 2025

(54) WORK TEACHING DEVICE AND WORK TEACHING METHOD FOR ROBOT

(71) Applicant: Hitachi High-Tech Corporation, Tokyo (JP)

(72) Inventors: Shinichi Ishikawa, Tokyo (JP); Masahiro Koyama, Tokyo (JP); Tomohiro Inoue, Tokyo (JP); Hiroki Takahashi, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 175 days.

(21) Appl. No.: 18/280,798

(22) PCT Filed: Mar. 15, 2021

(86) PCT No.: PCT/JP2021/010391
§ 371 (c)(1),
(2) Date: Sep. 7, 2023

(87) PCT Pub. No.: WO2022/195680
PCT Pub. Date: Sep. 22, 2022

(65) Prior Publication Data
US 2024/0300098 A1    Sep. 12, 2024

(51) Int. Cl.
*B25J 9/16* (2006.01)
(52) U.S. Cl.
CPC .................... *B25J 9/163* (2013.01)
(58) Field of Classification Search
None
See application file for complete search history.

(56) References Cited

U.S. PATENT DOCUMENTS 9,321,176 B1 *    4/2016   Sun ...................... B25J 15/0028
2010/0087955 A1 *  4/2010   Tsusaka ................. B25J 9/0003
                                                    700/245

(Continued)

FOREIGN PATENT DOCUMENTS

JP    2012-228757 A    11/2012
JP    2014-136275 A     7/2014

(Continued)

OTHER PUBLICATIONS

International Search Report (PCT/ISA/210) issued in PCT Application No. PCT/JP2021/010391 dated May 18, 2021 with English translation (4 pages).

(Continued)

*Primary Examiner* — Ryan Rink
(74) *Attorney, Agent, or Firm* — Crowell & Moring LLP

(57) ABSTRACT

A work teaching device for a robot that teaches work by a teacher to the robot is configured to include a teaching pose measurement unit that measures a position and posture of an object grasped by the teacher, a positioning detection unit for detecting that the object moved by the teacher is positioned, a grasping motion detection unit for detecting that the object is grasped by the teacher, a functional operation detection unit for detecting that the teacher operates a function of the object, a work state confirming motion detection unit that detects that confirmation of a work state of the object by the teacher is performed, a teaching program generation unit that receives signals from the teaching pose measurement unit, the positioning detection unit, the grasping motion detection unit, the functional operation detection unit, and the work state confirming motion detection unit and generates a teaching program for the robot in which the signals are divided for each movement of the teacher, and a teaching (Continued)

program execution unit that executes the teaching program generated by the teaching program generation unit.

15 Claims, 16 Drawing Sheets

(56) References Cited

U.S. PATENT DOCUMENTS

| | | | |
|---|---|---|---|
| 2014/0201112 A1 | 7/2014 | Sawada et al. | |
| 2018/0281197 A1 | 10/2018 | Shiraishi et al. | |
| 2019/0321983 A1* | 10/2019 | Chen | B25J 9/1633 |
| 2020/0346347 A1* | 11/2020 | Sankai | B25J 13/082 |
| 2021/0104213 A1* | 4/2021 | Furuya | G09B 15/08 |
| 2023/0031545 A1* | 2/2023 | Oleynik | B25J 11/009 |
| 2023/0278211 A1* | 9/2023 | Koyama | B25J 9/0081 |
| | | | 700/264 |
| 2024/0051143 A1* | 2/2024 | Dong | G06F 3/014 |

FOREIGN PATENT DOCUMENTS

| | | |
|---|---|---|
| JP | 2015-54378 A | 3/2015 |
| JP | 2015-71206 A | 4/2015 |
| JP | 2018-167334 A | 11/2018 |
| WO | WO 2019/064752 A1 | 4/2019 |

OTHER PUBLICATIONS

Japanese-language Written Opinion (PCT/ISA/237) issued in PCT Application No. PCT/JP2021/010391 dated May 18, 2021 (3 pages).

* cited by examiner

[FIG. 1]
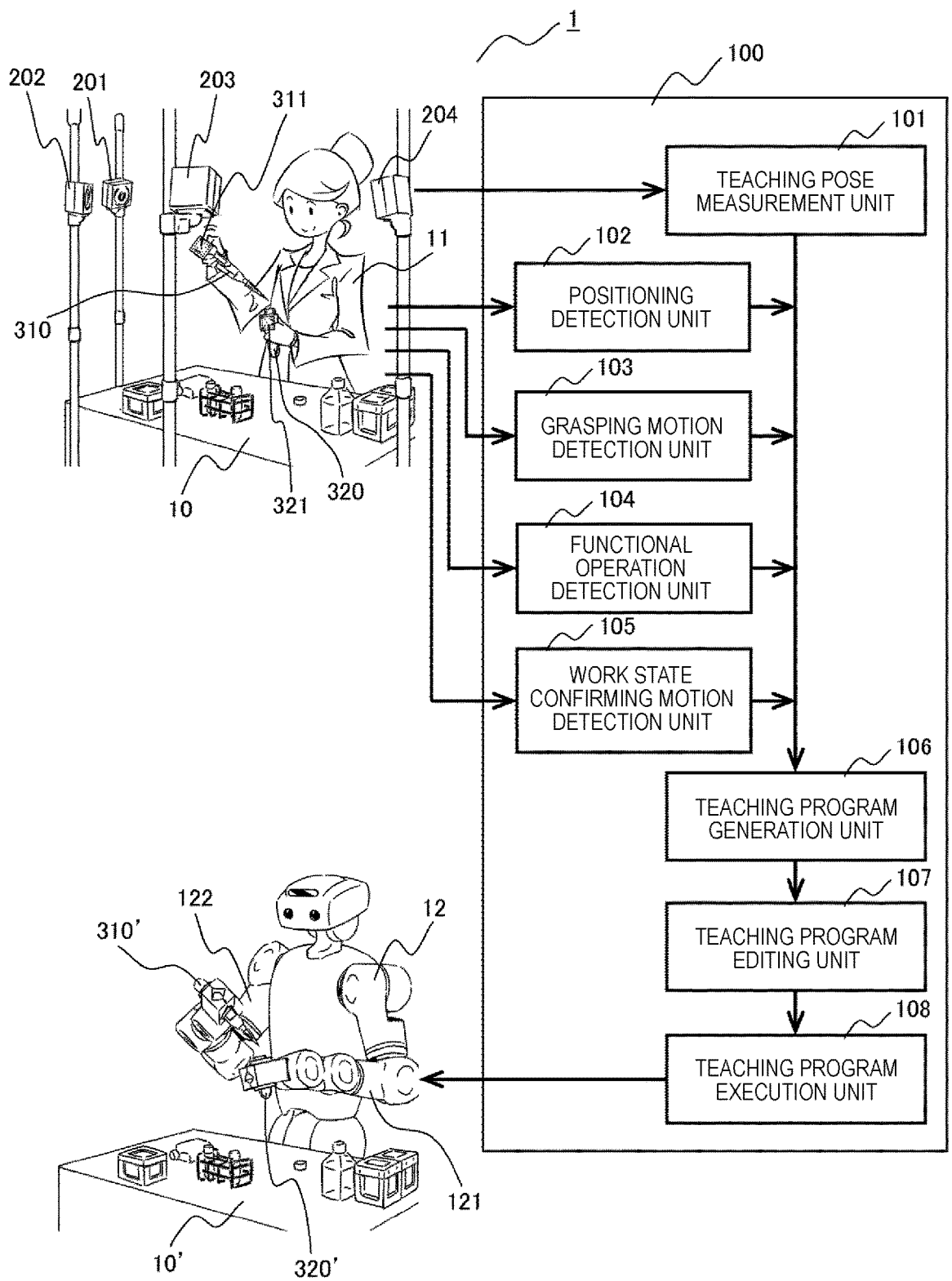

[FIG. 2]
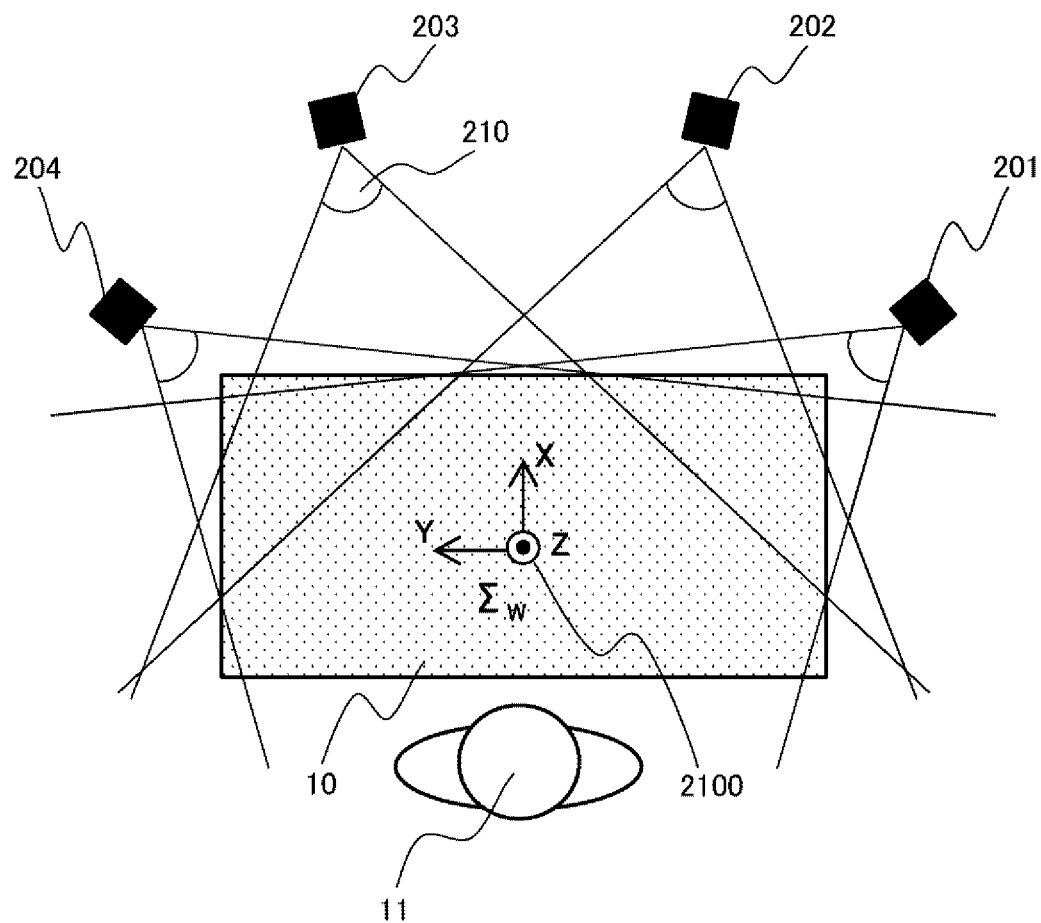

[FIG. 5]
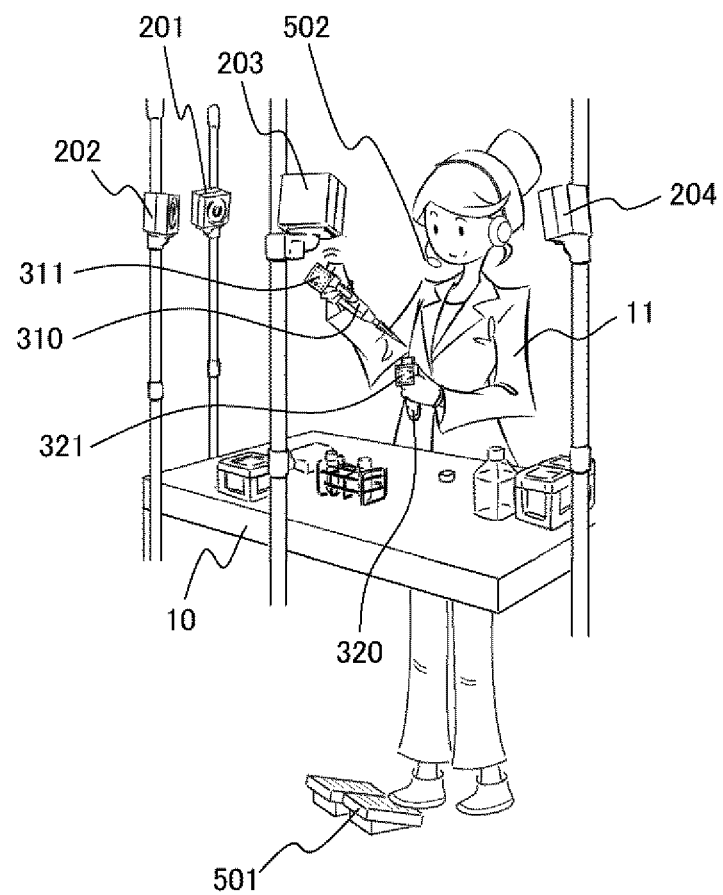

[FIG. 6]
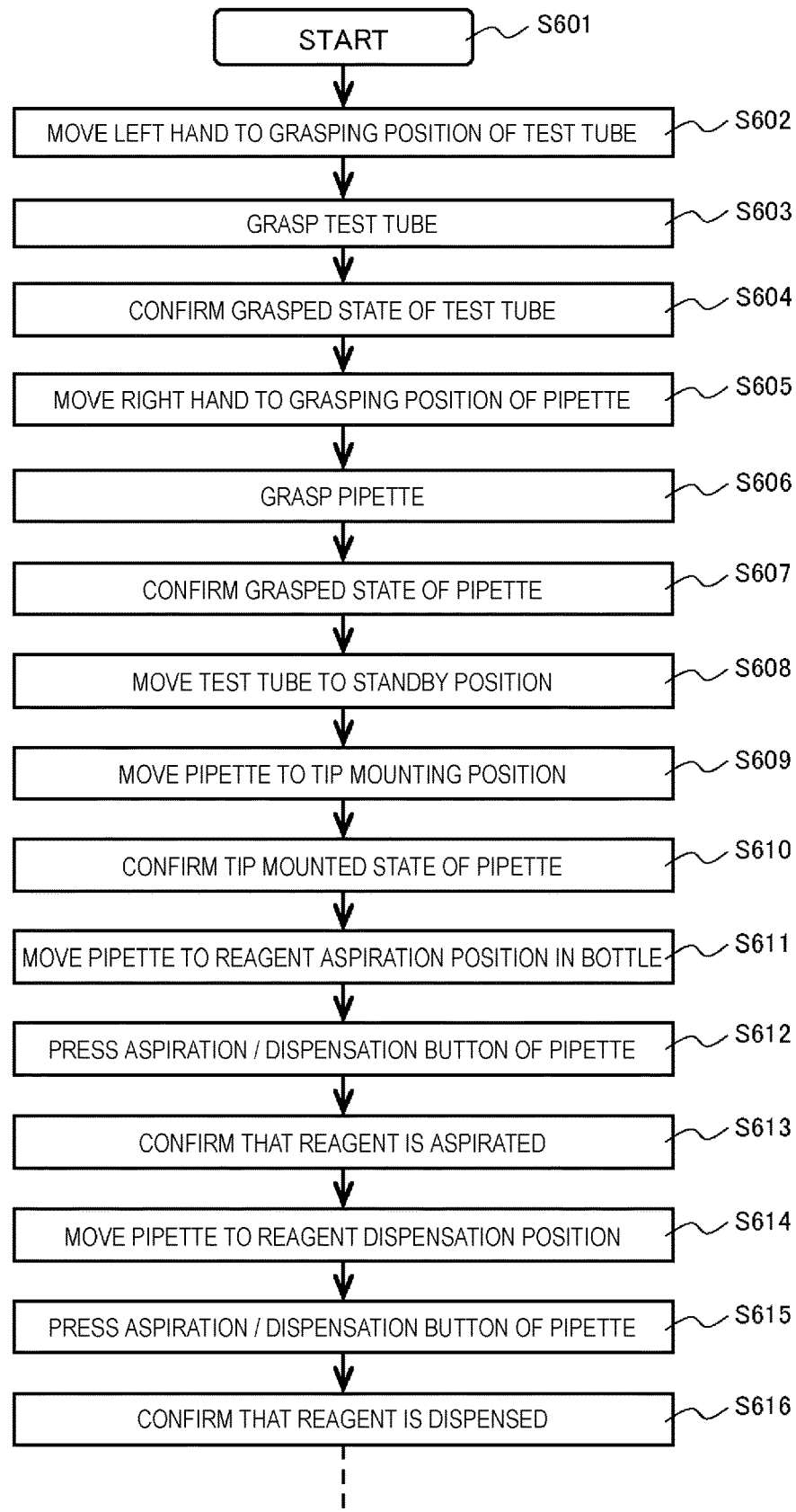

[FIG. 7]
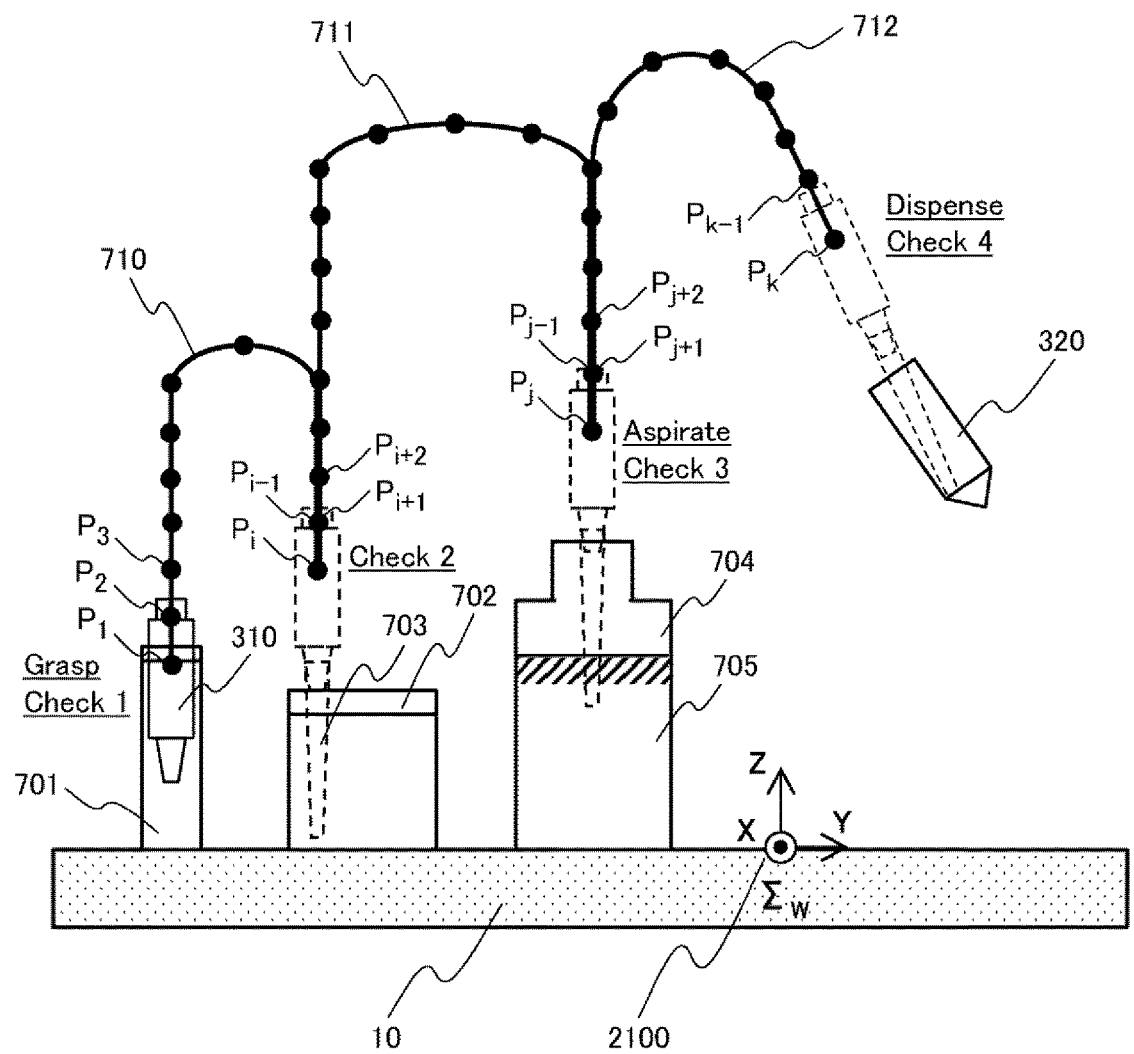

[FIG. 8]
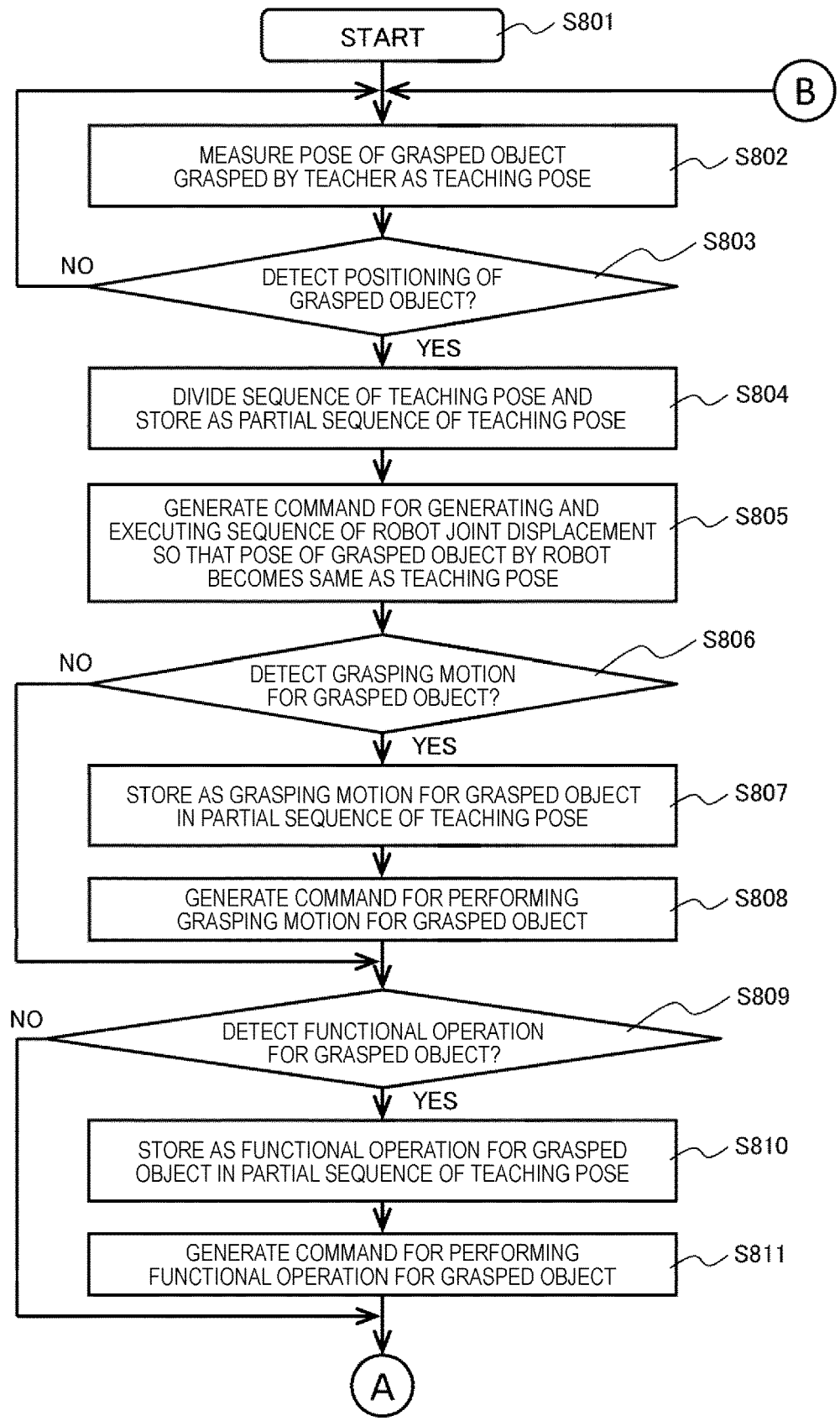

[FIG. 9]
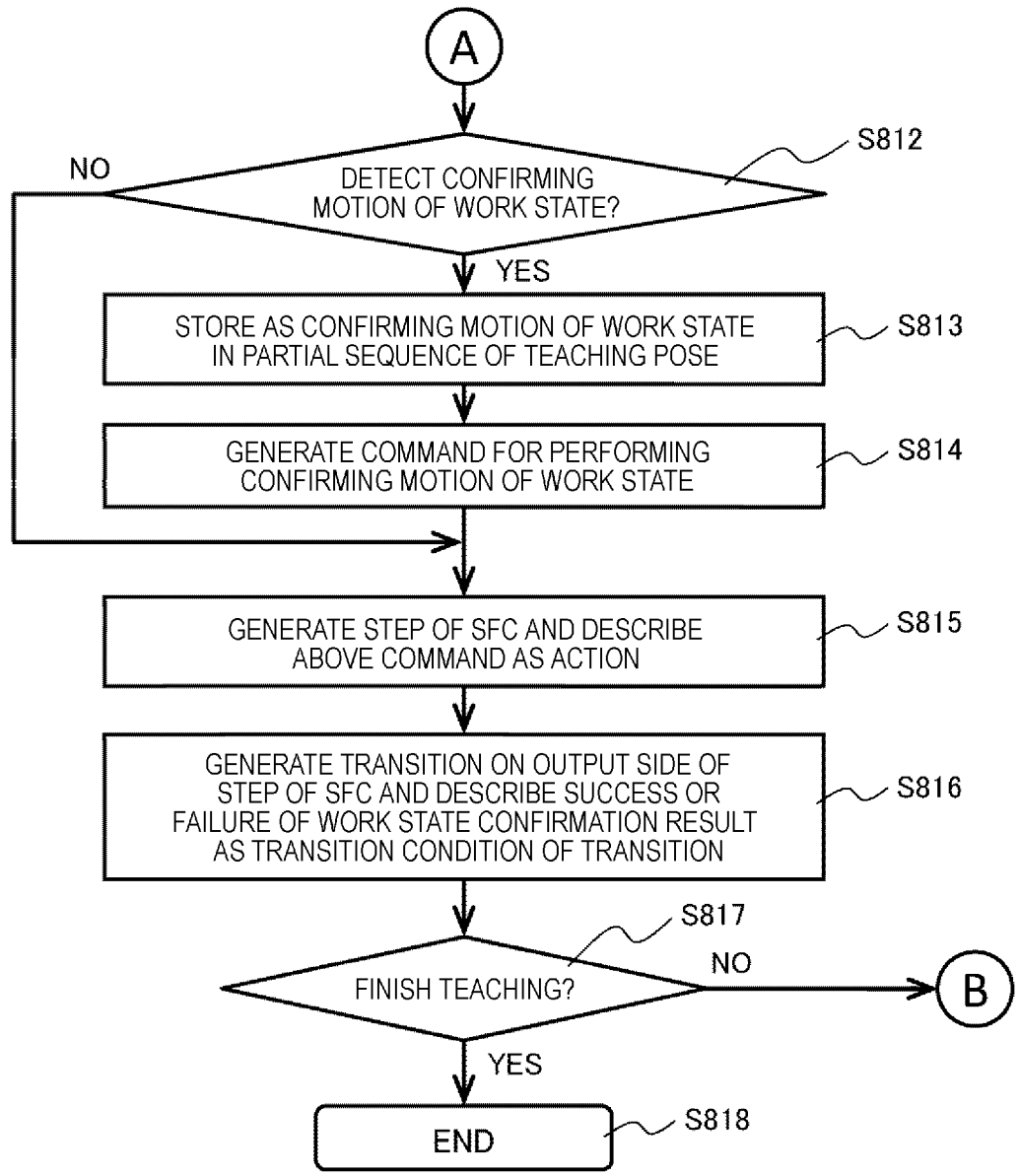

FIG. 10A

| No. | X | Y | Z | Rx | Ry | Rz | Rw |
|---|---|---|---|---|---|---|---|
| 1 | 0.064 | 0.424 | 0.364 | −0.482 | 0.494 | −0.515 | −0.509 |
| 2 | 0.049 | 0.429 | 0.363 | −0.494 | 0.492 | −0.512 | −0.501 |
| 3 | 0.046 | 0.433 | 0.379 | −0.505 | 0.502 | −0.505 | −0.488 |
| ⋮ | | | | | | | |

FIG. 10B

| No. | J1 | J2 | J3 | J4 | J5 | J6 | J7 |
|---|---|---|---|---|---|---|---|
| 1 | 3.643 | 24.316 | 20.841 | −27.593 | 28.330 | −29.493 | −29.137 |
| 2 | 2.781 | 24.556 | 20.796 | −28.304 | 28.199 | −29.362 | −28.712 |
| 3 | 2.616 | 24.805 | 21.713 | −28.941 | 28.764 | −28.912 | −27.964 |
| ⋮ | | | | | | | |

[FIG. 11]
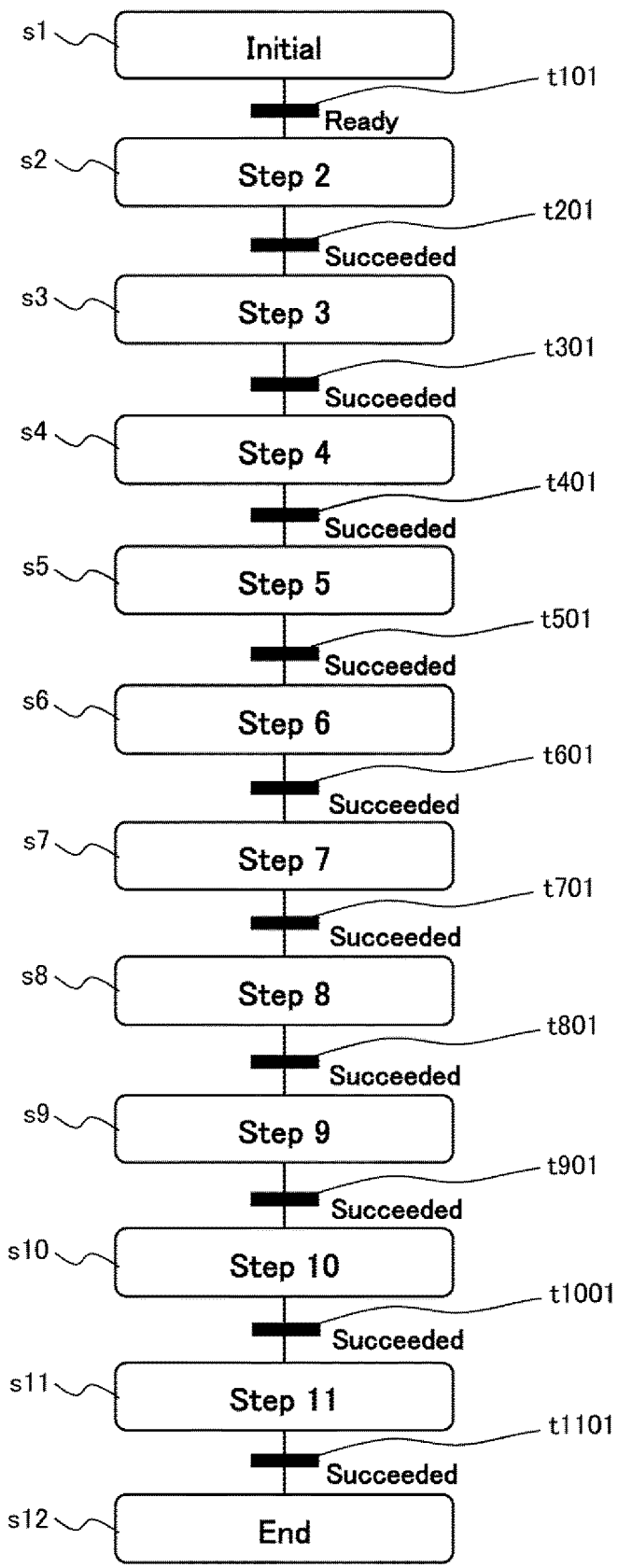

[FIG. 12]
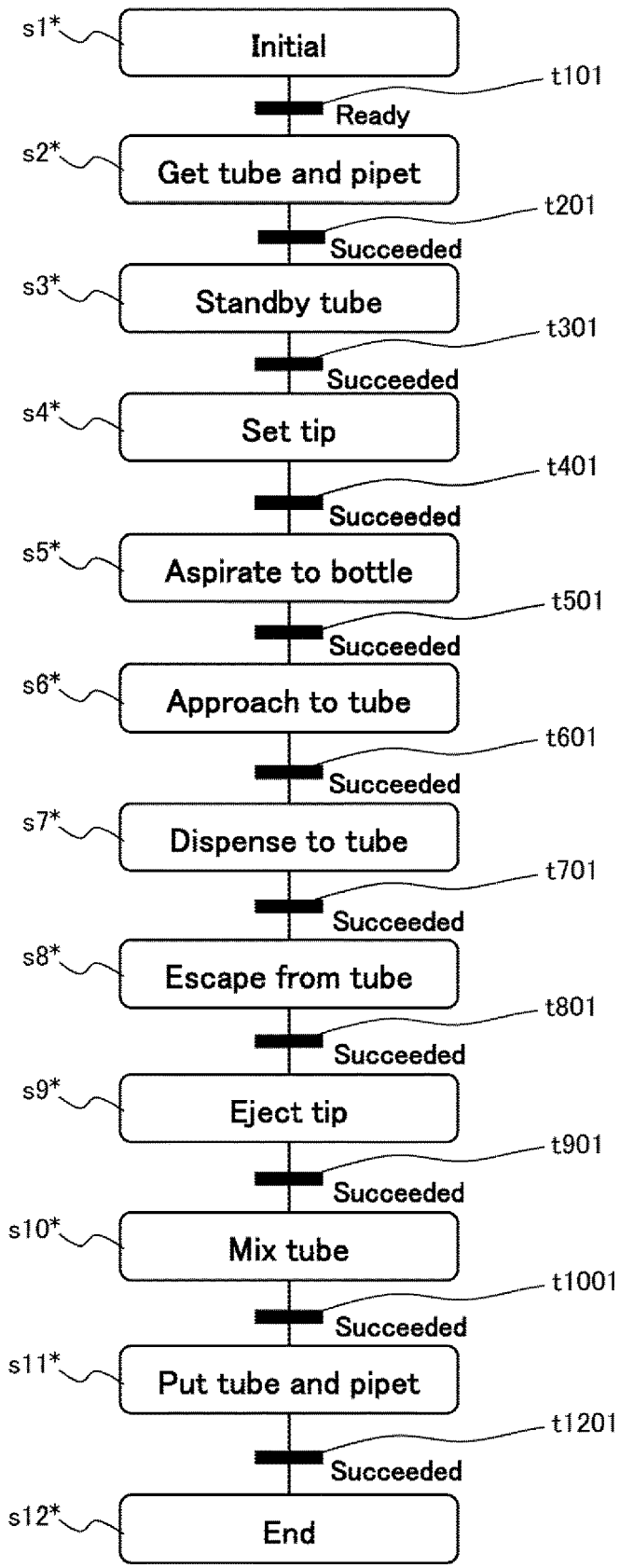

[FIG. 13]
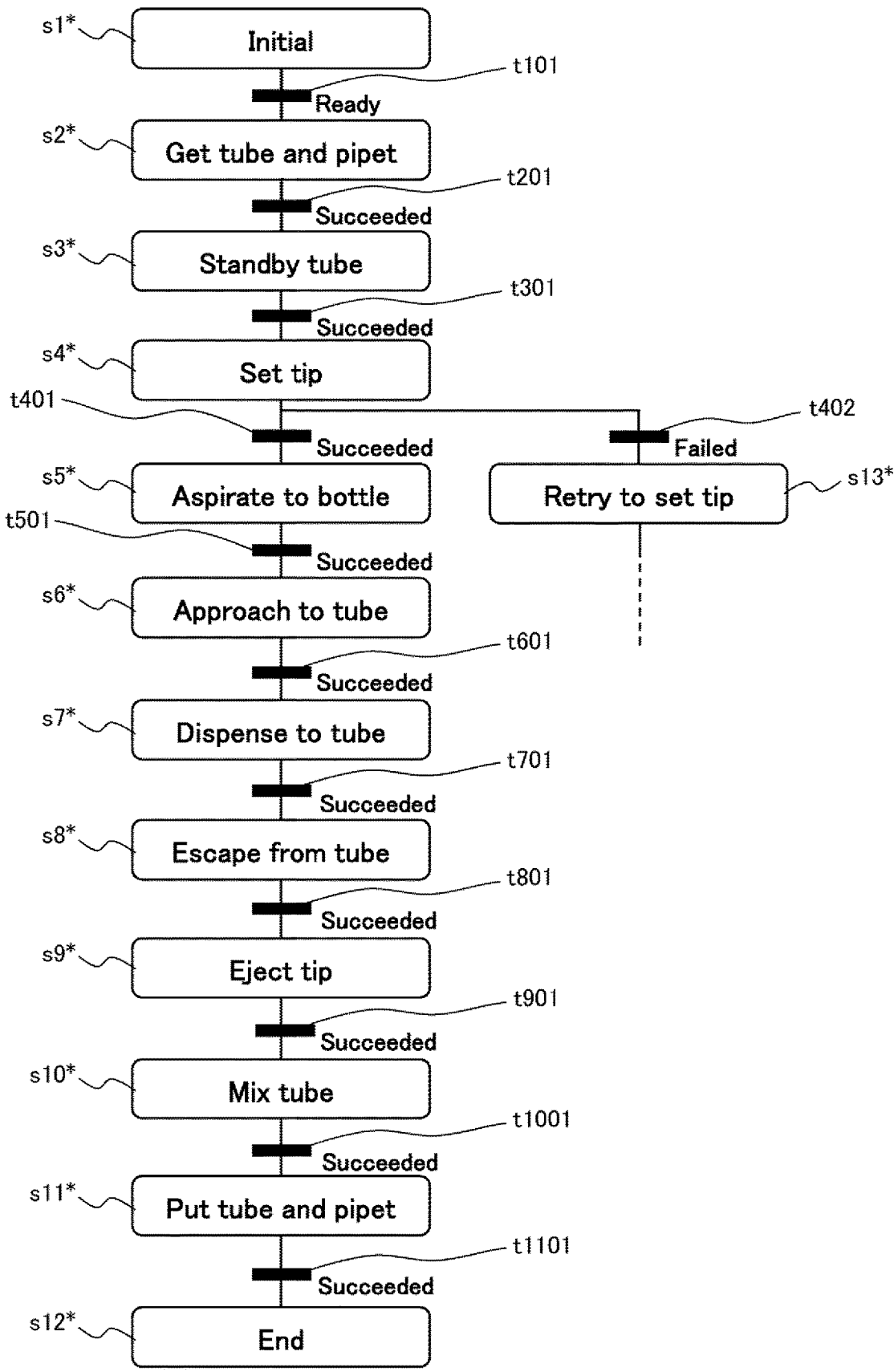

FIG. 14A

```
larm_move("traj_larm_s2")
rarm_move("traj_rarm_s2")
larm_grasp()
rarm_grasp()
larm_check("get_tube")
rarm_check("get_pipet")
```
1401

FIG. 14B

```
larm_check == SUCCEEDED and
rarm_check == SUCCEEDED
```
1402

FIG. 14C

```
rarm_move("traj_rarm_s4")
rarm_check("set_tip")
```
1403

FIG. 14D

```
rarm_check == SUCCEEDED
```
1404

FIG. 14E

```
rarm_move("traj_rarm_s6")
```
1405

FIG. 14F

```
rarm_status == SUCCEEDED
```
1406

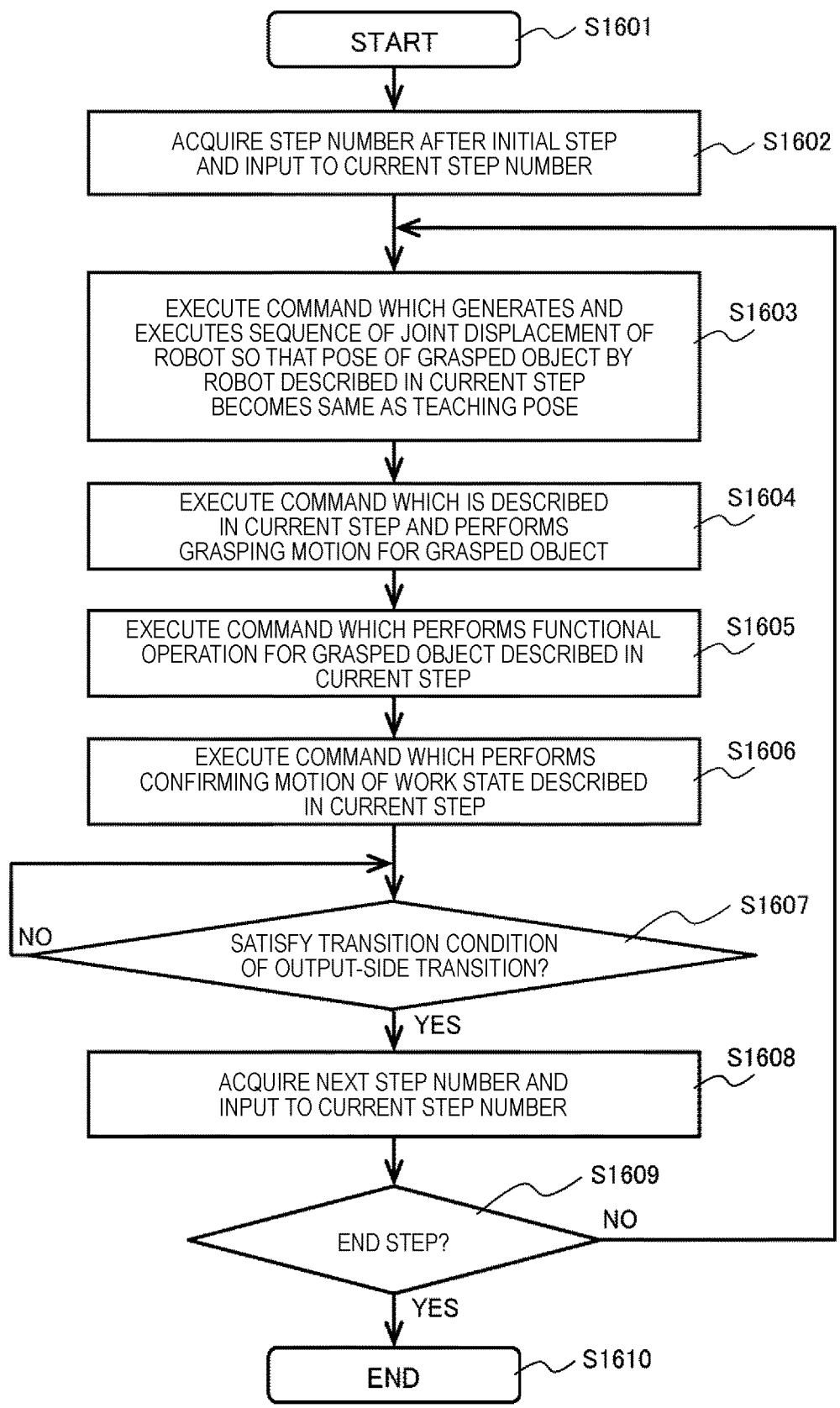
[FIG. 16]

WORK TEACHING DEVICE AND WORK TEACHING METHOD FOR ROBOT

TECHNICAL FIELD

The present invention relates to a work teaching device for a robot and a work teaching method for a robot for teaching a human work motion to the robot.

BACKGROUND ART

A robot teaching system of PTL 1 is configured such that a teaching tool with a button for specifying a teaching position of a robot is adjusted to a position where a teacher wants the robot to move, and by pressing the button here, the teaching position is specified, and further a position and posture of the teaching tool here is measured with a stereo camera and the position is determined as the teaching position of the robot, and then a teaching program is generated which interpolates between the teaching positions determined here and moves the robot.

PTL 2 describes a robot teaching system provided with an acquisition device that acquires work information including image information.

CITATION LIST

Patent Literature

PTL 1: JP2014-136275A
PTL 2: WO2019/064752

SUMMARY OF INVENTION

Technical Problem

When a series of tasks is executed by a robot while holding various work target objects and work tools with a hand provided on a wrist of the robot and operating various functions of the work tools, it is necessary to describe commands related to grasping and operating the work target objects and work tools in a teaching program of the robot while associating the commands with a sequence (movement path of the robot) of teaching positions of the robot.

A process of determining whether a current process ended normally at a stop of each process in a series of works of the robot and moving to a next process should also be described in the teaching program for the robot. For example, at the end of the process, a process of image-recognizing a state of the work target object and determining that the process ended normally when it is the same as a target state that is stored in advance, and otherwise the process ended abnormally is described in the teaching program.

The description of the teaching program for the robot as described above needs to be input by the teacher one by one, separately from the teaching of a movement position of the robot described in PTL 1. Therefore, as a work content to be executed by the robot becomes more complicated, input work and debugging work by the teacher increases, causing an increase in man-hours for developing the teaching program.

In the robot teaching system disclosed in PTL 2, in addition to teaching the movement position of the robot, it is necessary for the teacher to input one by one to teach the robot to operate the grasping target object and to detect the work state. Therefore, the input work and debugging work by the teacher increases, causing an increase in the man-hours required to develop the teaching program.

The present invention is made to solve the above problems. An object of the present invention to provide a work teaching device for a robot and a work teaching method for a robot for generating a teaching program for causing a robot to execute a series of works by measuring movement of a grasping target object such as a work target object and a work tool when a teacher demonstrates a series of works and, in synchronization with the measurement, detecting that the teacher has grasped and operated the grasping target object and confirmed a work state.

Solution to Problem

To solve the above problems, in the present invention, a work teaching device for a robot that teaches work by a teacher to the robot is configured to include a teaching pose measurement unit that measures a teaching pose that is a position and posture of an object (work target object, work tool, or the like) grasped by the teacher, a positioning detection unit for detecting that the object moved by the teacher is positioned, a grasping motion detection unit for detecting that the object is grasped by the teacher, a functional operation detection unit for detecting that the teacher operates a function of the object, a work state confirming motion detection unit that detects that confirmation of a work state of the object by the teacher is performed, a teaching program generation unit that receives signals from the teaching pose measurement unit, the positioning detection unit, the grasping motion detection unit, the functional operation detection unit, and the work state confirming motion detection unit and generates a teaching program for the robot in which the signals are divided for each movement of the teacher, and a teaching program execution unit that executes the teaching program generated by the teaching program generation unit.

To solve the above problems, in the present invention, a work teaching method for a robot that teaches work by a teacher to the robot is performed by measuring a teaching pose that is a position and posture of an object grasped by the teacher with a teaching pose measurement unit, detecting that the object moved by the teacher is positioned with a positioning detection unit in synchronization with the measurement of the teaching pose, detecting that the object is grasped by the teacher with a grasping motion detection unit in synchronization with the measurement of the teaching pose, detecting that the teacher operates a function of the object with a functional operation detection unit in synchronization with the measurement of the teaching pose, detecting that confirmation of a work state of the object by the teacher is performed with a work state confirming motion detection unit in synchronization with the measurement of the teaching pose, receiving signals from the teaching pose measurement unit, the positioning detection unit, the grasping detection unit, the functional operation detection unit, and the work state confirming motion detection unit and generating a teaching program for the robot in which the signals are divided for each movement of 41 the teacher with a teaching program generation unit, and executing the teaching program generated by the teaching program generation unit with a teaching program execution unit.

Advantageous Effects of Invention

According to the present invention, when converting a human work into a robot work, it is possible to generate a teaching program for a robot to perform a series of tasks, including not only a description of a movement path of a robot, but also descriptions of grasping a grasping target object by the robot, a functional operation for the grasping target object, and confirmation of a work state, simply by demonstrating the work as usual using the grasping target objects such as a work target object and a work tool used in the work by a human. Therefore, it becomes easier to teach the work to the robot, and there is an effect of improving development efficiency of a teaching program.

BRIEF DESCRIPTION OF DRAWINGS

FIG. 1 is a block diagram illustrating an overall configuration of a work teaching device for a robot 1 according to an example of the present invention.

FIG. 2 is a plan view illustrating an example of arranging cameras 201 to 204 for measuring a teaching pose on a workbench 10.

FIG. 5 is a perspective view of the teacher 11 and their surroundings, illustrating an example of using a footswitch 501 for inputting positioning, grasping, and functional operation of the grasping target object by the teacher 11, and a microphone 502 for inputting voice of the teacher 11.

FIG. 6 is a flow chart illustrating a work procedure of dispensing a reagent into the test tube 320 using the micropipette 310.

FIG. 7 is a front view of the workbench 10 on which a pipette stand 701, a tip box 702, and a reagent bottle 704 are placed, schematically illustrating a movement path of the micropipette 310 and an example of dividing the movement path as a partial sequence of the teaching pose when a dispensing work is performed using the micropipette 310 on the workbench 10.

FIG. 8 is a flow chart illustrating a procedure of processing of a teaching program generation unit 106.

FIG. 9 is a flow chart illustrating continuation of the procedure of processing of the teaching program generation unit 106 illustrated in FIG. 8.

FIG. 10A is a table illustrating an example of data of a partial sequence of the teaching pose generated by the teaching program generation unit 106, and FIG. 10B is a table illustrating an example of sequence data of a robot joint displacement generated from the partial sequence of the teaching pose generated by the teaching program generation unit 106.

FIG. 11 is a diagram illustrating an example of a teaching program for a robot generated by the teaching program generation unit 106 expressed in a form of a sequential function chart.

FIG. 12 is a diagram illustrating an example of the sequential function chart illustrated in FIG. 11 edited by a teaching program editing unit 107.

FIG. 13 is a diagram illustrating an example in which the sequential function chart illustrated in FIG. 12 is further edited by the teaching program editing unit 107.

FIG. 14A is a diagram illustrating a command string 1401 described as an action of step s2 in the sequential function charts illustrated in FIGS. 11 to 13, FIG. 14B is a diagram illustrating contents of a transition condition expression 1402 described as processing of a transition t201 on an output side of an action in step s2 in the sequential function charts illustrated in FIGS. 11 to 13, FIG. 14C is a diagram illustrating a command string 1403 described as processing of step s4 in the sequential function charts illustrated in FIGS. 11 to 13, FIG. 14D is a diagram illustrating contents of a transition condition expression 1404 described as processing of a transition t401 on an output side of an action in step s4 in the sequential function charts illustrated in FIGS. 11 to 13, FIG. 14E is a diagram illustrating a command string 1405 described as processing of step s6 in the sequential function charts illustrated in FIGS. 11 to 13, and FIG. 14F is a diagram illustrating contents of a transition condition expression 1406 described as processing of a transition t601 on an output side of an action in step s6 in the sequential function charts illustrated in FIGS. 11 to 13.

FIG. 16 is a flow chart illustrating a procedure of processing of a teaching program execution unit 108.

DESCRIPTION OF EMBODIMENTS

Figure 3A:
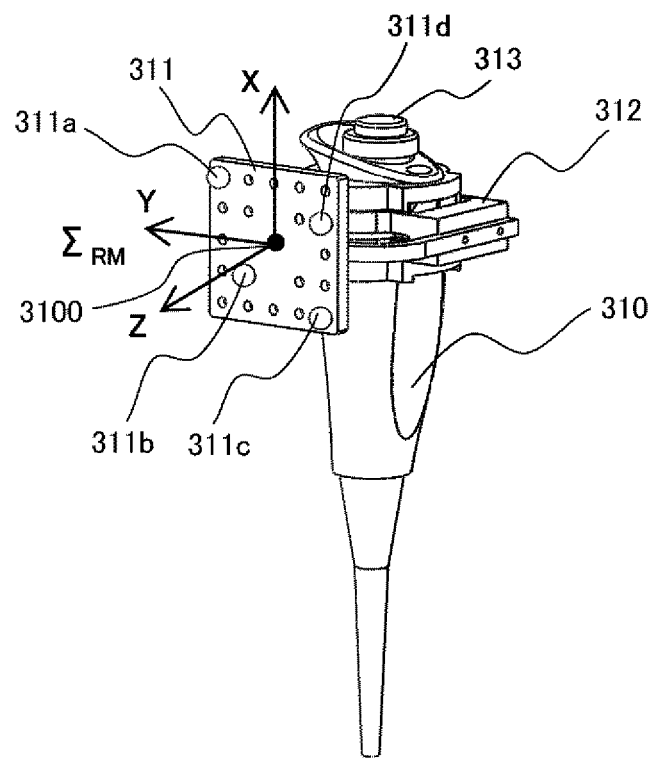
FIG. 3A is a perspective view of a micropipette 310 attached with a marker plate 311 for measuring the teaching pose.

A work teaching device for a robot according to an embodiment of the present invention is a teaching device for a robot that generates a teaching program that enables a robot to reproduce motions for a grasping target object by a teacher demonstrating a series of tasks. The teaching device for the robot is an device which can automatically generate a teaching program in which, by measuring position and posture of the grasping target object in chronological order using a camera or sensor or the like and detecting positioning, grasping, functional operations, and confirming motions for the grasping target object in synchronization with the measurement, the time-series data of the grasping target object is divided at timing of positioning, and commands are executed at timing of detecting the grasping the grasping target object, functional operations, and confirming motions.

As a result, in the work teaching device for the robot of the related art, it is necessary to separately program operation contents and work state confirmation processing after the robot motion teaching to execute the operation for the grasping target object and the work state confirmation. However, according to the present invention, it is possible to automatically generate a teaching program including functional operations for a grasping target object.

That is, in the work teaching device for the robot according to the present invention, the position and posture of a grasping target object grasped by a teacher is measured as a teaching pose, and a fact that the grasping target object is positioned is detected in synchronization with the measurement, and then at the timing when the positioning is detected, a teaching pose sequence is divided and stored as teaching pose partial sequences. In synchronization with the measurement of the teaching pose, the execution of the grasping of the grasping target object, the functional operation for the grasping target object, and the confirmation of the work state is detected, and then the executions are stored as acts of the grasping of the grasping target object, the functional operation for the grasping target object, and the confirmation of the work state, which are executed at the timing when the executions are detected.

Based on the pieces of information, a command that converts the partial sequences of the teaching pose into a sequence of robot joint displacements and executes the sequences so that the position and posture of the grasping target object grasped by the robot are similar to those of the teaching pose included in the partial sequences of the teaching pose, and the command executed according to the order taught by the teacher, and further a command for grasping the grasping target object, operating the function of the grasping target object, and confirming the work state is generated, and then a teaching program for a robot is generated which is described to execute the command at the timing when grasping the grasping target object, operating the function of the grasping target object, and confirming the work state are detected. By executing the teaching program for the robot generated here, a robot was made to execute a series of tasks in the same manner as the tasks demonstrated by the teacher.

In the work teaching method for the robot according to the embodiment of the present invention, the position and posture of a grasping target object grasped by a teacher is measured as a teaching pose, and a fact that the grasping target object is positioned is detected in synchronization with the measurement, and then at the timing when the positioning is detected, a teaching pose sequence is divided and stored as teaching pose partial sequences. In synchronization with the measurement of the teaching pose, the execution of the grasping of the grasping target object, the functional operation for the grasping target object, and the confirmation of the work state is detected, and then the executions are stored as acts of the grasping of the grasping target object, the functional operation for the grasping target object, and the confirmation of the work state, which are executed at the timing when the executions are detected. Based on the pieces of information, a command that converts the partial sequences of the teaching pose into a sequence of robot joint displacements and executes the sequences so that the position and posture of the grasping target object grasped by the robot are similar to those of the teaching pose included in the partial sequences of the teaching pose, and the command is executed according to the order taught by the teacher, and further a command for grasping the grasping target object, operating the function of the grasping target object, and confirming the work state is generated, and then a teaching program for a robot is generated which is described to execute the command at the timing when grasping the grasping target object, operating the function of the grasping target object, and confirming the work state are detected. By executing the teaching program for the robot generated here, a robot was made to execute a series of tasks in the same manner as the tasks demonstrated by the teacher.

Hereinafter, an example of the present invention will be described with reference to the drawings.

Example

FIG. 1 is a schematic diagram illustrating an overall configuration of a work teaching device for a robot 1 according to an example of the present invention.

The work teaching device for the robot 1 includes cameras 201 to 204 for measuring three-dimensional position and orientation of a grasping target object grasped by a teacher 11, a right marker plate 311 and a left marker plate 321 which are attached to the grasping target object, various devices described below for detecting positioning of the grasping target object grasped by the teacher 11, grasping motion, functional operation, and work state confirmation, and a computer 100 that executes each arithmetic processing unit related to work teaching.

In the work teaching device for the robot 1, the teacher 11 works facing a workbench 10 to teach a robot 12. For example, the teacher 11 dispenses a reagent with a working tool, micropipette 310, held in their right hand, into a working target object, test tube 320, held in their left hand. Hereinafter, the grasping target objects grasped by the teacher 11 will be referred to as first grasping target objects. The right marker plate 311 for motion capture is attached to the micropipette 310. The left marker plate 321 for motion capture is attached to the test tube 320.

Here, each of the right marker plate 311 and the left marker plate 321 is attached with a reflective marker for motion capture in a unique arrangement. When the right marker plate 311 and the left marker plate 321 are captured by the cameras 201, 202, 203, and 204, each of the right marker plate 311 and the left marker plate 321 is recognized separately, and the position and posture of a marker coordinate system set at a center of each plate are measured. The micropipette 310 and the test tube 320 are examples of grasping target objects grasped by the teacher 11, and the grasping target objects are not limited thereto.

The robot 12 is installed facing a workbench 10' similar to the workbench 10, and is taught to dispense a reagent into a test tube 320' held by a left hand of the robot with a micropipette 310' held by a right hand of the robot. Hereinafter, the grasping target objects grasped by the robot 12 will be referred to as second grasping target objects. The micropipette 310' and the test tube 320' (second grasping target object) correspond to the micropipette 310 and the test tube 320 (first grasping target object) which are grasped by the teacher 11. The micropipette 310' and the test tube 320' can be of the same shapes as the micropipette 310 and the test tube 320, but need not be exactly the same, and as long as the difference in shape is understood, the micropipettes and the test tubes may be of the same type, or may differ in shape, material, and other properties.

In the illustrated example, the robot 12 is a dual-arm robot including a left arm 121 and a right arm 122, but is not limited thereto. For example, the robot may be a combination of two robots, a single-arm robot with a right arm and a single-arm robot with a left arm. The two robots may be different kinds of robots. It is possible to reproduce the two-armed work of the teacher by a robot with three or more arms. The robot 12 is not limited to a model simulating a human figure as illustrated in the drawing, and is not limited to a specific shape as long as the robot can perform the desired motion.

A teaching pose measurement unit 101 measures the three-dimensional position and posture of grasping target objects (micropipette 310, test tube 320) grasped by the teacher 11 from images acquired by the cameras 201 to 204. In particular, the teaching pose measurement unit 101 takes images of the right marker plate 311 and the left marker plate 321 with the cameras 201, 202, 203, and 204, and measures the three-dimensional positions and postures of the right marker plate 311 and the left marker plate 321 in chronological order. Hereinafter, the three-dimensional position and posture of an object will be referred to as "pose". In other words, the "pose" is data including not only the position of the grasping target object, but also inclination and rotation of the grasping target object.

A positioning detection unit 102 detects that the grasping target object is positioned in synchronization with the measurement of the pose (hereinafter referred to as a teaching pose) of the grasping target object by the teaching pose measurement unit 101 during teaching by the teacher 11. Specifically, the positioning of the grasping target object is detected when the pose of the grasping target object measured by the teaching pose measurement unit 101 does not change for a certain period of time, or the positioning of the grasping target object is detected by any of pressure-sensitive switches 413 to 416 (see FIGS. 4A and 4B) worn on fingers of the teacher 11, a foot switch 501 (see FIG. 5) operated by the teacher 11 with their feet, or a microphone 502 (see FIG. 5) for inputting voice of the teacher 11, which will be described below.

A grasping motion detection unit 103 detects a grasping motion for the grasping target object in synchronization with the measurement of the teaching pose by the teaching pose measurement unit 101 during the teaching work by the teacher 11. In particular, the grasping motion (grasping/releasing) for the grasping target object is detected by receiving a signal from any of the pressure-sensitive switches 413 to 416 (see FIGS. 4A and 4B worn on the fingers of the teacher 11, the foot switch 501 (see FIG. 5) operated by the teacher 11 with their feet, or the microphone 502 (see FIG. 5) for inputting the voice of the teacher 11, which will be described below.

A functional operation detection unit 104 detects that a function of the grasping target object is operated in synchronization with the measurement of the teaching pose during teaching by the teacher 11. In particular, a fact that the function of the grasping target object is operated (for example, pressing a aspiration/dispensation button 313 of the micropipette 310, or the like) is detected by receiving a signal from any of pressure-sensitive switches 411 and 412 (see FIGS. 4A and 4B) worn on the fingers of the teacher 11, the foot switch 501 (see FIG. 5) operated by the teacher 11 with their feet, or the microphone 502 (see FIG. 5) for inputting the voice of the teacher 11, which will be described below.

A work state confirming motion detection unit 105 detects that the work state is confirmed during the teaching work by the teacher 11 in synchronization with the measurement of the teaching pose. In particular, a fact that the work state confirmation (for example, work state confirmation by a camera image recognition function provided in the robot 12) is performed is detected by receiving a signal from any of the pressure-sensitive switches 413 to 416 (see FIGS. 4A and 4B) worn on the fingers of the teacher 11, the foot switch 501 (see FIG. 5) operated by the teacher 11 with their feet, or the microphone 502 (see FIG. 5) for inputting the voice of the teacher 11, which will be described below.

A teaching program generation unit 106 divides time-series data (sequence) of a teaching pose at the timing when it is detected that the grasping target object (first grasping target object) grasped by the teacher 11 is positioned during the teaching work by the teacher 11, and stores the data as a partial sequence of the teaching pose. At the timing when the grasping motion for the first grasping target object and the functional operation for the first grasping target object are detected, the motions are stored as the motions for the first grasping target object, and then at the timing when the work state confirmation is detected, the confirmation is stored as the work state confirming motion.

Based on the above pieces of information, a teaching program for the robot 12 is generated in which a command that converts the partial sequences of the teaching pose into a sequence of joint displacements of the robot 12 and executes them so that the pose of the grasping target object (second grasping target object) grasped by the robot 12 is similar to each of the teaching poses included in the partial sequences of the teaching pose, and the command is executed according to the order taught by the teacher 11, and further a command for performing an operation on the second grasping target object is generated and the command is executed at the timing when the operation on the first grasping target object is detected, and further a command to confirm the work state is generated and the command is executed at the timing when the work state confirmation is detected.

A teaching program editing unit 107 is a tool that enables the teacher 11 to edit the teaching program for the robot 12 generated by the teaching program generation unit 106, such as corrections and additions, through a graphical user interface described below.

A teaching program execution unit 108 sequentially interprets commands described in the teaching program for the robot 12 generated by the teaching program generation unit 106 or the teaching program for the robot 12 edited by the teaching program editing unit 107. Then, the teaching program execution unit 108 outputs a joint drive command for executing the motion of the robot 12, a drive command for a hand provided at an arm of the robot 12, and the like, and controls each joint axis of the robot 12, the hand, and the like.

FIG. 2 illustrates an example of arrangement of the cameras 201 to 204 connected to the teaching pose measurement unit 101 illustrated in FIG. 1. The cameras 201 to 204 are arranged on an opposite side of the workbench 10 from the teacher 11 to measure the pose of the grasping target object (the micropipette 310, the test tube 320, and the like illustrated in FIG. 1) grasped by the teacher 11 working facing the workbench 10.

Fields of view 210 of the cameras 201 to 204 are set to overlap each other on the workbench 10, thereby covering an entire work area on the workbench 10, and capturing the poses of work tools and work target objects as grasping target objects. On the workbench 10, a workbench coordinate system 2100 (ΣW in the drawing) is set as a reference coordinate system for motion capture, and a pose of the grasping target object (work tool, work target object) measured by motion capture is represented as a pose in the workbench coordinate system 2100.

Figure 3B:
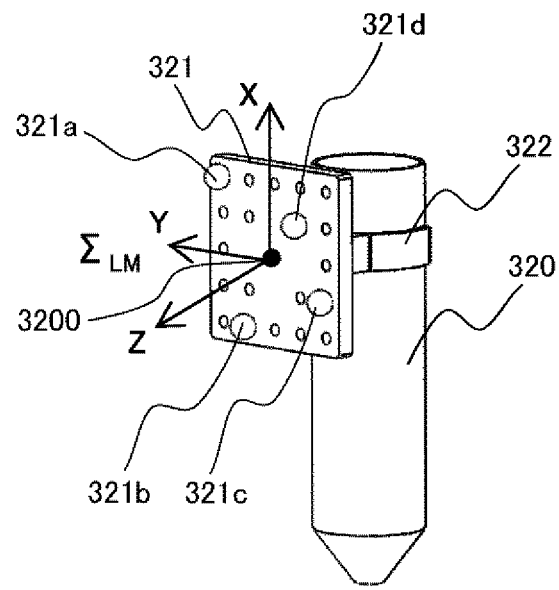
FIG. 3B is a perspective view of a test tube 320 to which a marker plate 321 for measuring the teaching pose is attached.

FIG. 3A illustrates a state where the right marker plate 311 is attached to the micropipette 310, and FIG. 3B illustrates a state where the left marker plate 321 is attached to the test tube 320. The micropipette 310 includes the aspiration/dispensation button 313. As illustrated in FIG. 3A, the micropipette 310 is equipped with an attachment 312 for attaching the right marker plate 311. Similarly, as illustrated in FIG. 3B, the test tube 320 is equipped with an attachment 322 for attaching the left marker plate 321.

The right marker plate 311 is attached to the micropipette 310 so that one (for example, an X axis) of axes of a right marker plate coordinate system 3100 (ΣRM in the drawing) set to the right marker plate 311 substantially coincides with a vertical direction of the micropipette 310. Similarly, the left marker plate 321 is attached to the test tube 320 so that one (for example, an X axis) of axes of a left marker plate coordinate system 3200 (ΣLM in the drawing) set to left marker plate 321 substantially coincides with the vertical direction of the test tube 320.

Four reflective markers 311a to 311d are arranged on a substrate of the right marker plate 311, and four reflective markers 321a to 321d are arranged on a substrate of the left marker plate 321. The reflective markers 311a to 311d illustrated in FIG. 3A are asymmetrically arranged on the substrate of the right marker plate 311 horizontally and vertically. The pose of the right marker plate 311 can be measured by registering an arrangement pattern of the reflective markers 311a to 311d in the teaching pose measurement unit 101. By arranging the markers asymmetrically in horizontal and vertical directions, the posture of the right marker plate 311 as a measurement target can be easily determined. The right marker plate coordinate system 3100 is defined as a coordinate system of which an origin is a center of the right marker plate 311 when the arrangement pattern of the reflective markers 311a to 311d is registered.

Similarly, the reflective markers 321a to 321d illustrated in FIG. 3B are asymmetrically arranged on the substrate of the left marker plate 321 horizontally and vertically. By making the arrangement patterns of the reflective markers on the right marker plate 311 and the left marker plate 321 different from each other, the teaching pose measurement unit 101 can easily identify the right marker plate 311 and the left marker plate 321 based on the arrangement pattern.

Instead of the different arrangement patterns, by making size and color of the reflective markers 311a to 311d illustrated in FIG. 3A different from those of the reflective markers 321a to 321d illustrated in FIG. 3B, it is also possible to distinguish left and right. It is also possible to distinguish left and right by changing the number of reflective markers on the marker plate 311 in FIG. 3A and the marker plate 321 in FIG. 3B.

Figure 4A:
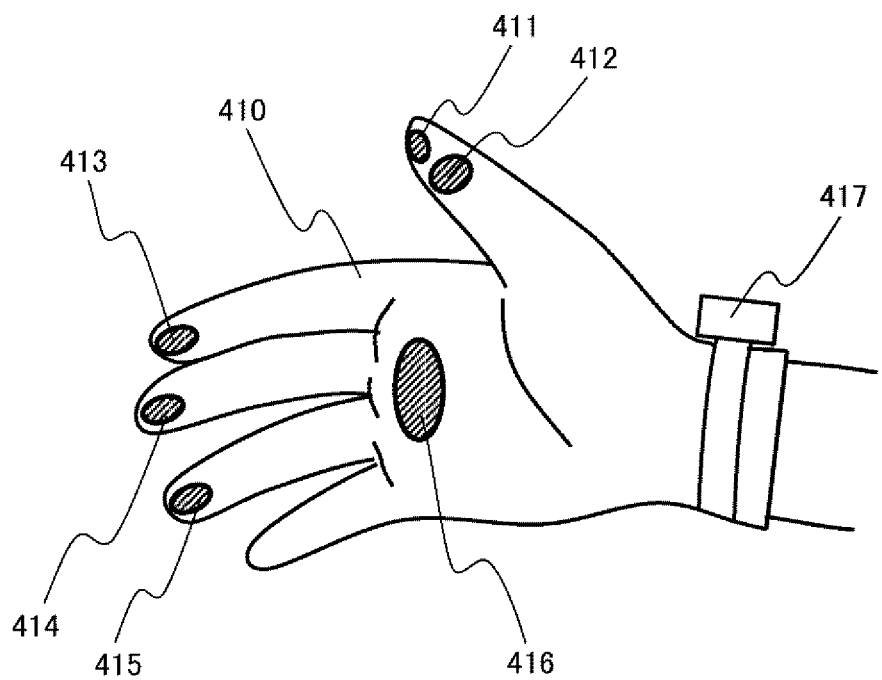
FIG. 4A is a perspective view of a teaching glove 410 including built-in pressure-sensitive switches 411 to 416 for detecting positioning, grasping, and functional operation of a grasping target object by a teacher 11.
Figure 4B:
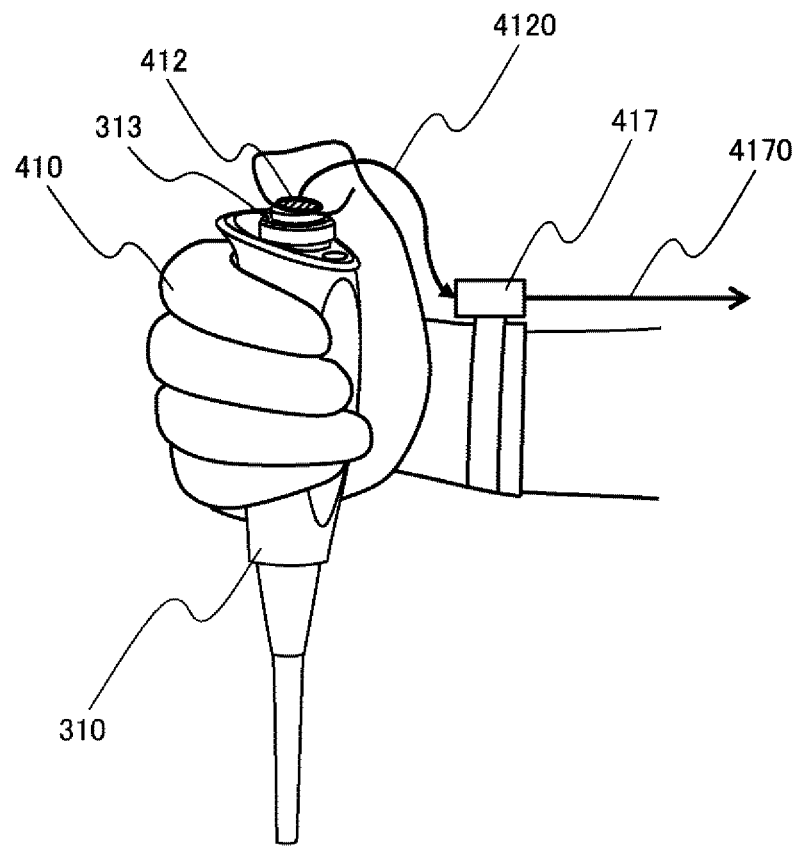
FIG. 4B is a perspective view of the teaching glove 410 illustrating an example of the teaching glove 410 worn on hands by the teacher 11 and holding the micropipette 310.

FIGS. 4A and 4B illustrate examples of a teaching glove 410 with the built-in pressure-sensitive switches 411 to 416 used as detection devices for the detection units 102 to 105 illustrated in FIG. 1 and the teacher 11 wearing the teaching glove 410 on their hands and holding the micropipette 310. FIG. 4A illustrates an example of the arrangement of the pressure-sensitive switches 411 to 416 in the teaching glove 410, and FIG. 4B illustrates a state in which the teacher 11 puts on the teaching glove 410, grasps the micropipette 310, and presses the aspiration/dispensation button 313.

The pressure-sensitive switches 411 and 412 are located on a thumb portion of the teacher 11 and can detect pressing of the aspiration/dispensation button 313 of the micropipette 310. The pressure-sensitive switches 413 to 416 can detect that the teacher 11 has grasped the micropipette 310. The signals from the pressure-sensitive switches 411 to 416 are input to a signal processing unit 417 (signal 4120), and the signal processing unit 417 outputs results of noise filtering and threshold determination processing to the computer 100 (signal 4170).

FIG. 5 is a diagram illustrating an example using the foot switch 501 used as a detection device for each of the detection units 102 to 105 illustrated in FIG. 1 and the microphone 502 for inputting voice of the teacher 11. A plurality of the foot switches 501 are provided. For example, at the timing when the teacher 11 grasps the micropipette 310 or operates the aspiration/dispensation button 313 during work teaching, by pressing the foot switches 501 assigned to the grasping motion and functional operation, the grasping motion and functional operation are detected to have been performed.

The microphone 502 is designed to pick up the voice during work teaching of the teacher 11. For example, at the timing when the teacher 11 grasps the micropipette 310 or operate the aspiration/dispensation button 313 during work teaching, by inputting the voice assigned to the grasping motion and functional operation, the grasping motion and functional operation are detected to have been performed.

As described above, the teaching glove 410 illustrated in FIGS. 4A and 4B and the foot switch 501 and microphone 502 illustrated in FIG. 5 can be used as detection devices connected to the detection units 102 to 105 illustrated in FIG. 1, and it is also possible to use the devices in combination according to the work teaching content, work environment, and the like.

FIG. 6 is a flow chart illustrating a procedure of dispensing a reagent into the test tube 320 using the micropipette 310. When the teacher 11 starts work (S601), first, a left hand moves to a grasping position of the test tube 320 placed on a test tube stand (S602) and grasps the test tube 320 (S603). Here, it is visually confirmed that the test tube 320 is normally grasped (S604). Next, a right hand is moved to a grasping position of the micropipette 310 placed on a pipette stand (S605), and the micropipette 310 is grasped (S606). Here, it is visually confirmed that the micropipette 310 is normally grasped (S607). The test tube 320 on the left hand is moved to a standby position (S608).

Next, the micropipette 310 on the right hand is moved to a tip mounting position, and a tip is mounted (S609). Here, it is confirmed visually that the tip is normally mounted (S610). Next, the micropipette 310 is moved to a reagent aspiration position in a reagent bottle (S611), and the aspiration/dispensation button 313 of the micropipette 310 is pressed to aspirate the reagent into the tip (S612). Here, it is visually confirmed that the reagent has been normally aspirated into the tip (S613). Next, a tip end of the micropipette 310 is moved to a dispensation position in the test tube 320 (S614), and the aspiration/dispensation button 313 of the micropipette 310 is pressed to dispense the reagent in the tip into the test tube 320 (S615). Here, it is visually confirmed that the reagent has been dispensed normally into the test tube 320 (S616). In FIG. 6, a procedure of a subsequent work is omitted.

The above procedure shows the work procedure by the teacher 11, but the robot 12 also follows exactly the same procedure using the micropipette 310' and the test tube 320'. In the case of the part that the teacher 11 visually confirms the work state, the work state is confirmed by the image recognition function of the camera connected to the robot 12. It is also possible to confirm such a work state by means other than the image recognition of the camera. For example, it is possible to confirm the grasping state of the micropipette 310' or the test tube 320' using a limit switch or contact sensor (not illustrated) built into the hand of the robot 12. It is also possible to confirm the state of reagent aspiration and dispensation by detecting a liquid level using a photoelectric sensor.

FIG. 7 is a view schematically illustrating a movement path of the micropipette 310 grasped by the right hand when the teacher 11 performs a dispensing operation using the micropipette 310 on the workbench 10, and an example of dividing the movement as partial sequences of the teaching pose.

First, the right hand is moved to the grasping position (indicated by P1 in the drawing) of the micropipette 310 placed on a pipette stand 701, and the micropipette 310 is grasped here (indicated by Grasp in the drawing). Here, it is visually confirmed that the micropipette 310 is normally grasped (indicated by Check 1 in the drawing). The grasping motion for the micropipette 310 is detected by pressing any of the pressure-sensitive switches 413 to 416 of the teaching glove 410 illustrated in FIGS. 4A and 4B, pressing the foot switch 501 illustrated in FIG. 5, or voice (for example, saying "Grasp") input through the microphone 502.

The confirming motion of the grasping state of the micropipette 310 is similarly detected by pressing any of the pressure-sensitive switches 413 to 416 of the teaching glove 410, pressing the foot switch 501, or voice (for example, saying "Check grasp pipet") input through the microphone 502.

Next, the micropipette 310 grasped by the right hand is moved along a movement path 710 to a mounting position (Pi in the drawing) of a tip 703 in a tip box 702 and positioned. Here, it is confirmed that the tip 703 is normally mounted (Check 2 in the drawing). The movement path 710 consists of a sequence of points, P1, P2, . . . , Pi, from the movement start point P1 to the positioning point Pi illustrated in the drawing. The point sequences are teaching poses obtained by measuring the movement of the micropipette 310 grasped by the teacher 11 in the three-dimensional space by motion capture when the teacher 11 demonstrates the work. The point sequences are time-series data measured at a constant sampling cycle. The data of the sequence of points forming the movement path 710 is the partial sequence of the teaching pose.

Positioning at the positioning point Pi is detected by stopping the motion for a certain period of time at Pi, or by pressing any of the pressure-sensitive switches 413 to 416 of the teaching glove 410, pressing the foot switch 501, or voice (for example, saying "Stop here") input through the microphone 502.

The confirming motion of the mounting state of the tip 703 on the micropipette 310 is detected by pressing any of the pressure-sensitive switches 413 to 416 of the teaching glove 410, pressing the foot switch 501, or voice (for example, saying "Check set tip") input through the microphone 502.

Next, the micropipette 310 with the tip 703 mounted is moved along a movement path 711 to a reagent aspiration position (Pj in the drawing) in a reagent bottle 704 and positioned. Here, the aspiration/dispensation button 313 of the micropipette 310 is pressed to aspirate a reagent 705 into the tip 703 (Aspirate in the drawing). It is confirmed that the reagent 705 is normally aspirated into the tip 703 (Check 3 in the drawing).

The movement path 711 consists of a sequence of points, Pi, Pi+1, . . . , Pj, from the movement start point Pi to the positioning point Pj. Positioning at the positioning point Pj is detected by stopping the motion for a certain period of time at Pj, or by pressing any of the pressure-sensitive switches 413 to 416 of the teaching glove 410, pressing the foot switch 501, or voice input through the microphone 502.

Pressing the aspiration/dispensation button 313 of the micropipette 310 at the positioning point Pj, that is, a functional operation for the micropipette 310 is detected by pressing either the pressure-sensitive switch 411 or 412 of the teaching glove 410, pressing the foot switch 501, or voice (for example, saying "Aspirate") input through the microphone 502.

Confirming that the reagent 705 is normally aspirated into the tip 703 is similarly performed by pressing any of the pressure-sensitive switches 413 to 416 of the teaching glove 410, pressing the foot switch 501, or voice (for example, saying "Check aspirate") input through the microphone 502.

Next, the micropipette 310 which has aspirated the reagent 705 is moved along a movement path 712 to a reagent dispensation position (Pk in the drawing) in the test tube 320 and positioned (it is assumed that the test tube 320 is grasped in advance with the left hand and is on standby). Here, the aspiration/dispensation button 313 of the micropipette 310 is pressed to dispense the reagent 705 into the test tube 320 (Dispense in the drawing). It is confirmed that the reagent 705 has been dispensed normally into the test tube 320 (Check 4 in the drawing). The movement path 712 consists of a sequence of points, Pj, Pj+1, . . . , Pk, from the movement start point Pj to the positioning point Pk. Positioning at the positioning point Pk is detected by stopping the motion for a certain period of time at Pk, or by pressing any of the pressure-sensitive switches 413 to 416 of the teaching glove 410, pressing the foot switch 501, or voice input through the microphone 502.

Pressing the aspiration/dispensation button 313 of the micropipette 310 at the positioning point Pk, that is, the functional operation for the micropipette 310 is detected by pressing either the pressure-sensitive switch 411 or 412 of the teaching glove 410, pressing the foot switch 501, or voice (for example, saying "Dispense") input through the microphone 502.

The confirming motion of a dispensing state into the test tube 320 is similarly detected by pressing any of the pressure-sensitive switches 413 to 416 of the teaching glove 410, pressing the foot switch 501, or voice (for example, saying "Check dispense") input through the microphone 502.

FIGS. 8 and 9 are flow charts illustrating procedures of processing of the teaching program generation unit 106. In the teaching program generation unit 106, when the teacher 11 starts teaching the work by demonstrating the work (S801), the teaching pose measurement unit 101 measures the pose of the grasping target object grasped by the teacher 11 as a teaching pose (S802). Here, in the case of the work using both hands as in the work illustrated in FIG. 6, each pose of the grasping target objects grasped by the right hand and left hand of the teacher 11 is measured as a teaching pose.

Next, when the grasping target object positioning detection unit 102 detects the positioning of either the grasping target object on the right hand or the grasping target object on the left hand (YES in S803), the time-series data (sequence) of the teaching poses that have been measured for the hand on the side which detected positioning is divided, and the data is stored as a partial sequence of the teaching poses of the hand on the side which detected positioning (S804). When the positioning of either the grasping target object on the right hand or the grasping target object on the left hand s not detected (NO in S803), the teaching pose measurement is continued (S802).

Next, after storing the partial sequence in S804, a command is generated which converts a partial sequence of teaching poses into a sequence of joint displacements of the robot 12 so that the pose of the grasping target object by the robot 12 becomes the same as the teaching pose, and executes the command (S805). When the grasping motion detection unit 103 detects a grasping motion for the grasping target object by the hand on the side which detected positioning (YES in S806), the motion is stored as the grasping motion for the grasping target object in the partial sequence of the teaching pose (S807). On the other hand, when no grasping motion is detected (NO in S806), the process proceeds to S809.

Next, after the grasping motion is stored in S807, a command for grasping the grasping target object is generated (S808). When the functional operation detection unit 104 detects the functional operation of the grasping target object by the hand on the side which detected positioning (YES in S809), the operation is stored as the functional operation for the grasping target object in the partial sequence of the teaching pose (S810). On the other hand, when the functional operation for the grasped part is not detected (NO in S809), the process proceeds to S812 illustrated in FIG. 9.

Next, after storing the functional operation in S810, a command for performing the functional operation for the grasping target object is generated (S811). When the work state confirming motion detection unit 105 detects the confirming motion of the work state by the hand on the side which detected positioning (YES in S812), the motion is stored as the work state confirming motion in the partial sequence of the teaching pose (S813). On the other hand, when no confirming motion is detected (NO in S812), the process proceeds to S815.

Next, after storing the confirming motion in S813, a command for performing the confirming motion of the work state is generated (S814).

After the processing described above is completed, a step of a sequential function chart is generated as a teaching program for the robot 12, and the commands generated above are described as actions to be executed there (S815). A transition on an output side of the step is generated, and success or failure of the confirmation result of the work state is described here as a transition condition of the transition (S816). After that, when the teacher 11 finishes demonstrating the work (YES in S817), the process of the teaching program generation unit 106 ends (S818). On the other hand, when the work teaching by the teacher 11 is continued (NO in S817), the process returns to the teaching pose measurement in S802.

In the present embodiment, an example of describing the teaching program in the form of a sequential function chart is shown, but instead, it is also possible to describe using a form such as a flow chart or a state transition diagram.

FIGS. 10A and 10B are diagrams illustrating examples of data of a partial sequence of teaching poses generated by the teaching program generation unit 106 and a robot joint displacement sequence generated from here. FIG. 10A illustrates an example of data 1001 of the partial sequence of the teaching pose, in which the pose of a grasping target object grasped by the teacher 11 is expressed as a sequence of three-dimensional positions and postures (quaternions). FIG. 10B illustrates an example of data 1002 of the sequence of the joint displacements of the robot 12, which is represented here as a sequence of joint angles when the arm of the robot 12 has a seven-axis configuration.

As shown here, the partial sequence data 1001 of the teaching pose and the sequence data 1002 of the joint displacement of the robot 12 are respectively managed as data for one hand of the teacher 11 and the robot 12. When the work by the teacher 11 is bimanual work, the data are generated for the right hand and the left hand.

Each of the partial sequence data 1001 of the teaching pose and the sequence data 1002 of the joint displacement of the robot 12 is stored as time-series data. The partial sequence data 1001 of the teaching pose is three-dimensional position and posture data at each time, and the sequence data 1002 of the joint displacement of the robot 12 is data in which each joint angle data is arranged in chronological order. The data are given serial numbers (indicated by No. in the drawing), and each serial number corresponds to each time. Here, each time indicates the time updated in a sampling period of the motion capture described above, and for example, the time is incremented by 50 milliseconds.

In FIG. 10A, the positions of the teaching poses are represented by a Cartesian coordinate system (X, Y, Z), but it is also possible to represent the positions by another coordinate system, such as a cylindrical coordinate system. Although the postures of teaching poses are represented by quaternions (Rx, Ry, Rz, Rw), the postures can also be represented by roll, pitch, yaw, Euler angles, and the like. Although FIG. 10B illustrates an example in which the arm of the robot 12 has a seven-axis configuration (names of the axes are J1 to J7), other axis configurations may be used. Although the joint displacements of J1 to J7 are represented by angle data of a rotation axis, it is also possible to represent joint displacements with another method, such as the position of a translational axis.

FIG. 11 is a diagram illustrating an example of a teaching program for a robot generated by the teaching program generation unit 106 expressed in a form of a sequential function chart. First, when the teacher 11 starts teaching work, an initial step s1 is generated, and a step name "Initial" is described here. Here, a transition t101 on an output side of the initial step s1 is generated at the same time, and a comment "Ready" is described here. A link is generated connecting the initial step s1 and the transition t101. There is no transition condition between an action executed in the initial step s1 and the transition t101 on the output side, and when program execution is started, a next step is unconditionally shifted.

The initial step s1 is internally given a step number 1, and the transition t101 is given a transition number 101 (indicating a first transition on the output side of the step s1). Assignment of the step numbers and transition numbers is the same for subsequent steps and transitions.

As described in a processing procedure of FIG. 8, when the positioning of either hand of the teacher 11 is detected, a next step s2 is generated, where a step name "Step 2" is described. At the same time, a transition t201 on an output side of the step s2 is generated, and a comment "Succeeded" is described here. A link is generated between the step s2 and the transition t201. The step names and comments automatically described here can be corrected later by the teaching program editing unit 107.

When the step s2 is generated, first, a partial sequence (corresponding to FIG. 10A) of teaching poses of the hand on a side which detected positioning is generated as an action to be executed there, and a command to generate and execute a sequence (corresponding to FIG. 10B) of a joint displacement of the robot 12 is generated so that the pose of the grasping target object by the robot 12 is the same as the teaching pose. Here, when a grasping motion of the hand on the side which detected positioning is detected, a command for performing a grasping motion for the grasping target object is generated. When a confirming motion of a work state of the hand on the side which detected positioning is detected, a command for performing a confirming motion of the work state is generated.

As a transition condition of the transition t201, a conditional expression for determining success or failure of the confirmation result is described when the confirming motion of the work state is performed. When the confirming motion of the work state is not performed, it is determined as the transition condition of the transition t201 that the sequence of joint displacements of the robot, that is, the motion up to the positioning of the robot has been completed normally, and when the grasping motion for the grasping target object has been performed, that the motion has been completed normally.

Henceforth, similarly, when any hand positioning of the teacher 1 is detected, the following steps and transitions are generated (from s3 to s12 and from t301 to t1201 in the example illustrated in FIG. 11) and the actions and transition conditions are generated. In the example illustrated in FIG. 11, an end step s12 is generated when the teacher 11 completes teaching work, and a step name "End" is described here. There is no action for the end step s12.

In the sequential function chart illustrated in FIG. 11, the order of program processing is described by connecting steps and transitions with links, and connection relation of the links express the order of work taught by the teacher 11.

FIG. 12 is a diagram illustrating an example of editing the sequential function chart illustrated in FIG. 11 by the teaching program editing unit 107. In the drawing, the step names are corrected to names (an example of English notation is shown) representing the work contents. In FIG. 12, steps corresponding to the steps illustrated in FIG. 11 are indicated by the same numbers and marked with *. The work contents with the same step numbers in FIGS. 11 and 12 are the same. That is, FIG. 12 becomes a program representing the following work.

When program execution starts (s1*), the test tube 320' is grasped by the hand of the left arm 121, and the micropipette 310' is grasped by the hand of the right arm 122, and the test tube and the micropipette are taken out from the respective stands (s2*). Next, the test tube 320' gripped by the left arm 121 is moved to a standby position (s3*). The tip 703 in the tip box 702 is mounted on the micropipette 310' grasped by the hand of the right arm 122 (s4*). Next, the reagent 705 in the reagent bottle 704 is aspirated into the tip 703 of the micropipette 310' (s5*), the reagent 705 is inserted to the dispensation position in the test tube 320' grasped by the hand of the left arm 121 (s6*), and the reagent 705 is dispensed (s7*). Next, the micropipette 310' is pulled out from the test tube 320' (s8*), and the tip 703 is removed from the micropipette 310' (s9*). Then, the test tube 320' grasped by the hand of the left arm 121 is shaken to stir the reagent 705 therein (s10*). Finally, the test tube 320' and the micropipette 310' are placed on respective stands (s11*), completing a series of tasks (s12*).

In FIG. 12, comments for each transition are left as same as in FIG. 11, but the comments can be modified as appropriate. For example, the comment for the transition t201 may simply be "OK".

FIG. 13 is a diagram illustrating an example in which the sequential function chart illustrated in FIG. 12 is further edited. In the diagram, an example is shown in which in the program described to confirm the mounting state of the tip 703 by image recognition of the camera when the tip 703 is mounted on the micropipette 310' (s4*), and if the mounting of the tip 703 is successful (t401), move to a next step s4*, error handling processing is added such that when the mounting of the tip 703 fails (t402), the operation for mounting the tip 703 is performed again (s13*).

Similarly, since in each transition of the program in FIG. 13, a conditional expression for determining success or failure of the confirmation result of the work state of the immediately preceding step is described, it is possible to add countermeasure processing when the confirmation result of the work state is unsuccessful, that is, when some kind of error occurs. As such, the teaching program editing unit 107 later adds error handling processing to the teaching program automatically generated by the work demonstration of the teacher 11, thereby improving reliability of the teaching program execution.

When a user wants to change the operation according to the work conditions (for example, to increase the number of times the test tube 320' is shaken during stirring according to the type of reagent 705), it is also possible to add new transitions and steps and describe transition conditions (for example, a conditional expression that determines the type of reagent 705) and actions (for example, a command to execute an operation that increases the number of times the test tube 320' is shaken) here. As such, it is possible to extend the function of the teaching program.

FIGS. 14A to 14F are diagrams illustrating examples of processing descriptions of steps and transitions in the sequential function charts illustrated in FIGS. 11 to 13.

FIG. 14A illustrates a command string 1401 described as an action of the step s2 in FIGS. 11 to 13. "larm_move ("traj_larm_s2")" in the command string 1401 is a command for executing a partial sequence (automatically stored under the name "traj_larm_s2") of the teaching pose of the left arm 121 of the robot 12 divided as the motion of the step s2 (s2*).

Similarly, "rarm_move ("traj_rarm_s2")" is a command for executing a partial sequence (automatically stored under the name "traj_rarm_s2") of the teach pose for the right arm 122 of the robot 12. "larm_grasp( )" is a command for closing the hand of the left arm 121 of the robot 12 to grasp an object (test tube 320' in the example). "rarm_grasp( )" is a command to close the hand of the right arm 122 of the robot 12 to grasp an object (micropipette 310' in the example).

"larm_check ("get_tube")" is a command for confirming by image recognition whether the hand of the left arm 121 is holding the test tube 320' normally. Similarly, "rarm_check ("get_pipet")" is a command for confirming by image recognition whether the hand of the right arm 122 is holding the micropipette 310' normally.

FIG. 14B illustrates a transition conditional expression 1402 described as processing of transition t201 on an output side of the step s2 (s2*). "larm_check==SUCCEEDED and rarm_check==SUCCEEDED" in the transition conditional expression 1402 is a conditional expression indicating that it is confirmed that the test tube 320' and the micropipette 310' are properly grasped, and is a conditional expression for determining whether the confirmation result of the work state of the robot 12 is successful. The conditional expressions are automatically generated from the contents of the command string 1401.

FIG. 14C illustrates a command string 1403 described as processing of the step s4 (s4*) in FIGS. 11 to 13, and FIG. 14D illustrates a transition conditional expression 1404 described as processing of the transition t401 on an output side. The processing contents are the same as those of the command string 1401 and the transition conditional expression 1402, and "rarm_check ("set_tip")" is a command for confirming by image recognition whether the tip 703 is normally mounted on the micropipette 310' grasped by the hand of the right arm 122.

FIG. 14E illustrates a command string 1405 described as processing of the step s6 (s6*) in FIGS. 11 to 13, and FIG. 14F illustrates a transition conditional expression 1406 described as processing of the transition t601 on an output side. "rarm_move ("traj_rarm_s6")" in the command string 1405 is a command for executing the partial sequence (automatically stored under the name "traj_rarm_s6") of the teaching pose of the right arm 122 of the robot 12 divided as the motion of step s5 (s5*). "rarm_status==SUCCEEDED" in the transition conditional expression 1406 is a conditional expression indicating that the execution of this command, that is, the movement of the right arm 122 has ended normally. When the work state confirmation is not particularly performed as in the command string 1401 described above, a conditional expression indicating that the command of the step has been completed normally is described as in the transition conditional expression 1406. The conditional expression is automatically generated from the contents of the command string 1405.

Figure 15A:
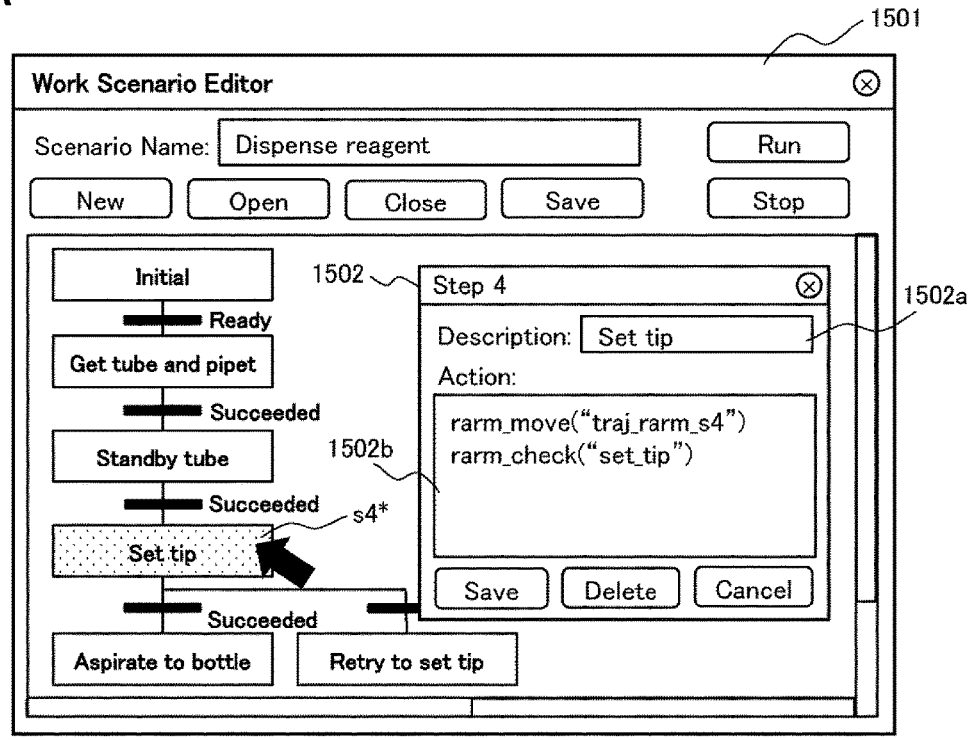
FIG. 15A is a front view of a screen 1501 on which the teaching program editing unit 107 is operated to edit the processing of step s4 of the sequential function charts illustrated in FIGS. 11 to 13.
Figure 15B:
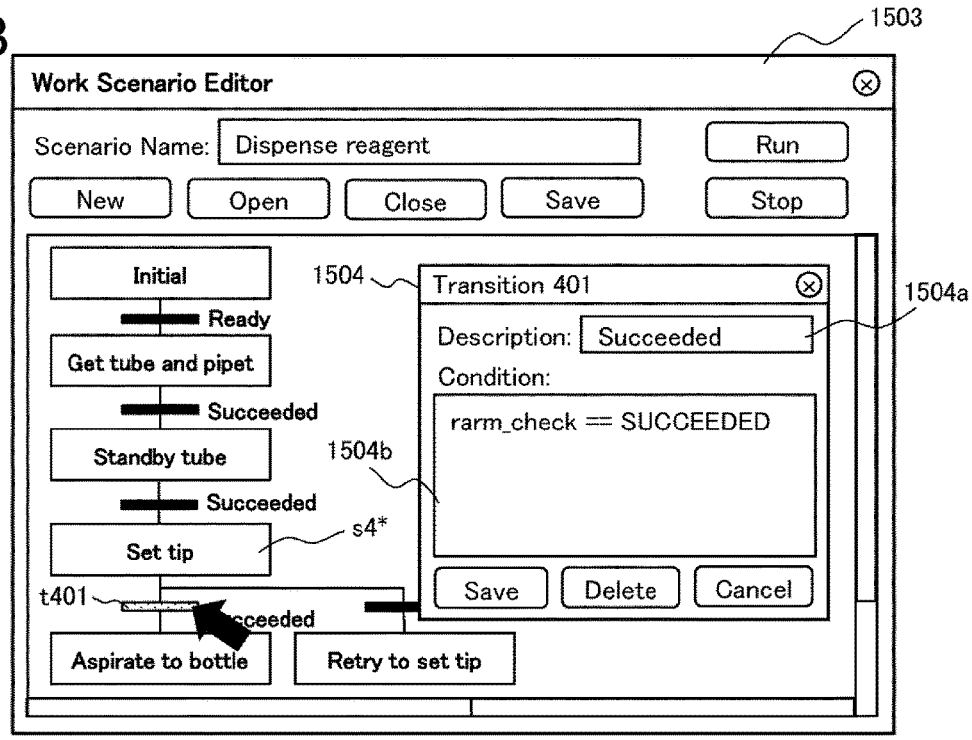
FIG. 15B is a front view of a screen 1503 on which the teaching program editing unit 107 is operated to edit a transition condition expression of the transition t401 of the sequential function charts illustrated in FIGS. 11 to 13.

FIGS. 15A and 15B are diagrams illustrating examples of display and input of screens forming the teaching program editing unit 107. The screen that forms the teaching program editing unit 107 may be provided on the computer 100 or may be provided at a location remote from the computer 100 (not illustrated).

FIG. 15A illustrates a screen 1501 for editing processing of the step s4 (s4*) of the sequential function charts illustrated in FIGS. 11 to 13. Here, when a cursor such as a mouse is placed on the step s4 and double-clicked, a step edit window 1502 is displayed. Then, on the step edit window 1502, editing (rewrite "Step 4" to "Set tip" in the example of the drawing) a name 1502a of the step s4 and editing a command string 1502b to be executed in the step s4* are performed.

FIG. 15B illustrates a screen 1503 for editing a transition conditional expression of the transition t401. Here, when the cursor of the mouse or the like is placed on the transition t401 and double-clicked, a transition edit window 1504 is displayed. Then, on the transition edit window 1504, a comment 1504a of the transition t401 is edited, and a conditional expression 1504b of the transition condition to be determined at the transition t401 is edited (in the example, the automatically generated description is used as it is).

FIG. 16 is a flow chart illustrating a procedure of processing of the teaching program execution unit 108. When the teaching program execution unit 108 starts executing the teaching program (S1601), first, the step number of the next step after the initial step is acquired from the link connection relation of the sequential function chart, which is the teaching program as illustrated in FIGS. 11 to 13, and the next step number is input to the internally held current step number (S1602). Next, various commands described in the step indicated by the current step number are executed. That is, a command for generating and executing the sequence of joint displacements of the robot 12 is executed so that the pose of the grasping target object by the hand of the robot 12 becomes the same as the teaching pose (S1603). Next, a command for performing grasping motion for the grasping target object by the hand of the robot 12 is executed (S1604), and a command for performing the functional operation for the grasping target object by the hand of the robot 12 is executed (S1605). Then, a command for performing the confirming motion of the work state by the robot 12 is executed (S1606). After that, when the conditional expression described as the transition condition is satisfied at any transition on the output side of the current step (YES in S1607), the next step number is acquired from the connection relation of the link of the sequential function chart and is input to the current step number (S1608). When the transition condition is not satisfied at any transition on the output side of the current step (NO in S1607), the procedure waits until one of the conditions is satisfied.

When the current step number updated in S1608 matches the step number of the end step (YES in S1609), execution of the teaching program ends (S1610). On the other hand, when the updated current step number does not match the step number of the end step (NO in S1609), the steps from S1603 are repeated.

As described above, according to the present embodiment, when converting a human work into a robot work, it is possible to generate a teaching program for a robot to perform a series of tasks, including not only a description of a movement path of a robot, but also descriptions of grasping a grasping target object by the robot, a functional operation for the grasping target object, and confirmation of a work state, simply by demonstrating the work as usual using the grasping target objects used in the work by a human. Therefore, compared to the method of the related art of separately programming operation contents and operation state confirmation processing after measuring a motion for the grasping target object, it becomes easier to teach the work to the robot, and thus development efficiency of a teaching program can be improved.

The present invention is not limited to the above-described embodiment, and includes various modification examples. For example, the above-described embodiment is described in detail to explain the present invention in an easy-to-understand manner, and is not necessarily limited to those having all the configurations described. Part of the configuration of one embodiment can be replaced with the configuration of another embodiment, and the configuration of another embodiment can be added to the configuration of one embodiment. It is possible to add, delete, or replace part of the configuration of each embodiment with another configuration.

REFERENCE SIGNS LIST

1: robot work teaching device
100: computer
10, 10': workbench
11: teacher
12: robot
201 to 204: camera
310, 310': micropipette
320, 320': test tube
311, 321: marker plate
210: field of view of camera
2100: workbench coordinate system
311a to 311d, 321a to 321d: reflective marker
312, 322: attachment
3100, 3200: marker plate coordinate system
410: teaching glove
411 to 416: pressure-sensitive switch
417: signal processing unit
4120, 4170: signal
501: foot switch
502: microphone
701: pipette stand
702: tip box
703: tip
704: reagent bottle
705: reagent
710 to 712: movement path
1001: sequence of teaching pose
1002: sequence data of robot joint displacement
s1 to s13: step of sequential function chart
t101 to t1101: transition of sequential function chart
1401, 1403, 1405: command string
1402, 1404, 1406: transition conditional expression
1501, 1503: screen of teaching program editing unit

1502: step edit window
1502a: step name
1502b: command string
1504: transition edit window
1504a: comment of transition
1504b: transition conditional expression

The invention claimed is:

1. A work teaching device for a robot that teaches work by a teacher to the robot, the device comprising:
  a teaching pose measurement unit that measures a teaching pose that is a position and posture of an object grasped by the teacher;
  a positioning detection unit for detecting that the object moved by the teacher is positioned;
  a grasping motion detection unit for detecting that the object is grasped by the teacher;
  a functional operation detection unit for detecting that the teacher operates a function of the object;
  a work state confirming motion detection unit that detects that confirmation of a work state of the object by the teacher is performed;
  a teaching program generation unit that receives signals from the teaching pose measurement unit, the positioning detection unit, the grasping motion detection unit, the functional operation detection unit, and the work state confirming motion detection unit and generates a teaching program for the robot in which the signals are divided for each movement of the teacher; and
  a teaching program execution unit that executes the teaching program generated by the teaching program generation unit.

2. The work teaching device for the robot according to claim 1, further comprising:
  a display unit, wherein
  the display unit includes a first area for displaying the teaching program for the robot generated by the teaching program generation unit in a sequential function chart format, a second area for displaying a command string to be executed in a step selected from the teaching program in the sequential function chart format displayed in the first area, and a third area for displaying a conditional expression determined by the transition selected from the teaching program in the sequential function chart format displayed in the first area.

3. The work teaching device for the robot according to claim 1, wherein
  the device detects that the object moved by the teacher is positioned with the positioning detection unit, detects that the object is grasped by the teacher with the grasping motion detection unit, detects that the teacher operates the function of the object with the functional operation detection unit, and detects that the confirmation of the work state of the object by the teacher is performed with the work state confirming motion detection unit are performed in synchronization with measuring the teaching pose by the teacher with the teaching pose measurement unit.

4. The work teaching device for the robot according to claim 1, further comprising:
  an imaging unit that captures the movement of the teacher from a plurality of directions;
  an operation detection unit that detects positioning of the object by the teacher, grasping motion for the object, or functional operation for the object; and
  an input unit for the teacher to input that the positioning of the object, the grasping motion for the object, or the functional operation for the object is performed are further provided, wherein
  the teaching pose measurement unit, the positioning detection unit, the grasping motion detection unit, the functional operation detection unit, and the work state confirming motion detection unit receive and process a signal from the imaging unit, the operation detection unit, or the input unit and output the processed signal to the teaching program generation unit.

5. The work teaching device for the robot according to claim 4, wherein
  the teaching program generation unit divides the signal from the positioning detection unit, the signal from the operation detection unit, or the signal from the input unit for each timing of receiving the signal to generate the teaching program for the robot.

6. The work teaching device for the robot according to claim 4, wherein
  the positioning detection unit detects that the object moved by the teacher is positioned when the movement of the teacher imaged by the imaging unit does not change for a certain period of time, or when a signal detected by the operation detection unit or a signal input by the teacher to the input unit is received.

7. The work teaching device for the robot according to claim 4, wherein
  the operation detection unit includes a pressure-sensitive switch worn by the teacher on a finger, the input unit includes either a foot switch operated by the teacher with a foot or a microphone for inputting voice of the teacher, and the grasping motion detection unit receives an output signal from the pressure-sensitive switch, the foot switch, or the microphone to detect that the grasping motion for the object by the teacher is performed.

8. The work teaching device for the robot according to claim 4, wherein
  the operation detection unit includes a pressure-sensitive switch worn by the teacher on a finger, the input unit includes either a foot switch operated by the teacher with a foot or a microphone for inputting voice of the teacher, and the functional operation detection unit receives an output signal from the pressure-sensitive switch, the foot switch, or the microphone to detect that the functional operation for the object by the teacher is performed.

9. The work teaching device for the robot according to claim 4, wherein
  the operation detection unit includes a pressure-sensitive switch worn by the teacher on a finger, the input unit includes either a foot switch operated by the teacher with a foot or a microphone for inputting voice of the teacher, and the work state confirming motion detection unit receives an output signal from the pressure-sensitive switch, the foot switch, or the microphone to detect that confirmation of the work state of the object by the teacher is performed.

10. The work teaching device for the robot according to claim 1, wherein
  the teaching program for the robot which is generated by the teaching program generation unit and divided for each motion of the teacher is a teaching program for the robot which is divided for unit motions separated by positioning points of the grasping target object and described to generate a motion of the robot such that the teaching pose included in the unit motion and a position and posture of an object of the same type as the object grasped by the robot are matched.

11. A work teaching method for a robot that teaches work by a teacher to the robot, the method comprising:
    measuring a teaching pose that is a position and posture of an object grasped by the teacher with a teaching pose measurement unit;
    detecting that the object moved by the teacher is positioned with a positioning detection unit in synchronization with the measurement of the teaching pose;
    detecting that the object is grasped by the teacher with a grasping motion detection unit in synchronization with the measurement of the teaching pose;
    detecting that the teacher operates a function of the object with a functional operation detection unit in synchronization with the measurement of the teaching pose;
    detecting that confirmation of a work state of the object by the teacher is performed with a work state confirming motion detection unit in synchronization with the measurement of the teaching pose;
    receiving signals from the teaching pose measurement unit, the positioning detection unit, the grasping motion detection unit, the functional operation detection unit, and the work state confirming motion detection unit and generating a teaching program for the robot in which the signals are divided for each movement of the teacher with a teaching program generation unit; and
    executing the teaching program generated by the teaching program generation unit with a teaching program execution unit.

12. The work teaching method for the robot according to claim 11, wherein
    in generating the teaching program, a sequence of the teaching pose is divided at timing when the positioning detection unit detects that the object moved by the teacher is positioned, and the divided sequence is stored as a partial sequence of the teaching pose, and then a signal detected by the grasping motion detection unit that the object is grasped by the teacher, a signal detected by the functional operation detection unit that the teacher operates a function of the object, and a signal detected by the work state confirming motion detection unit that confirmation of a work state of the object by the teacher is performed are stored in association with the stored partial sequence of the teaching pose.

13. The work teaching method for the robot according to claim 12, wherein
    in generating the teaching program, the teaching program for the robot is generated which is described to be converted into a joint displacement sequence of the robot and executed such that the teaching pose included in the partial sequence of the teaching pose and a position and posture of an object of the same type as the object grasped by the robot are matched.

14. The work teaching method for the robot according to claim 12, wherein
    in generating the teaching program, the teaching program for the robot to be generated is described in a form of a sequential function chart, and a command for converting the partial sequence of the teaching pose into the joint displacement sequence of the robot and executing the sequence, a command for a motion to be performed by the robot based on a grasping motion for the object by the teacher detected by the grasping motion detection unit, a command for a motion to be performed by the robot based on the operation of the function of the object by the teacher which is detected by the functional operation detection unit, and a command for a motion to be performed by the robot based on the confirmation of the work state of the object by the teacher which is detected by the work state confirming motion detection unit are created, and then a process of executing the created commands is defined as steps of the sequential function chart and the sequential function chart is generated by connecting the steps in an order of the partial sequence of the teaching pose.

15. The work teaching method for the robot according to claim 14, wherein
    success or failure of a confirmation result of the work state is described as a transition condition between the steps in a transition of the sequential function chart.

* * * * *